US008121717B2

(12) United States Patent
Idaka et al.

(10) Patent No.: US 8,121,717 B2
(45) Date of Patent: Feb. 21, 2012

(54) THREE DIMENSIONAL PROCESSING DATA SETTING SYSTEM, METHOD FOR SETTING THREE-DIMENSIONAL PROCESSING DATA, COMPUTER PROGRAM FOR SETTING THREE-DIMENSIONAL PROCESSING DATA, MEDIUM WITH THREE-DIMENSIONAL PROCESSING DATA STORED THEREIN THAT IS READABLE BY COMPUTER AND LASER PROCESSING EQUIPMENT OPERATED BY THE THREE-DIMENSIONAL DATA

(75) Inventors: Mamoru Idaka, Osaka-fu (JP); Hideki Yamakawa, Osaka-fu (JP); Hiroyasu Hasebe, Osaka-fu (JP); Kotaro Morizono, Osaka-fu (JP)

(73) Assignee: Keyence Corporation, Osaka (JP)

( * ) Notice: Subject to any disclaimer, the term of this patent is extended or adjusted under 35 U.S.C. 154(b) by 668 days.

(21) Appl. No.: 11/585,356

(22) Filed: Oct. 23, 2006

(65) Prior Publication Data
US 2007/0100492 A1 May 3, 2007

(30) Foreign Application Priority Data
Oct. 21, 2005 (JP) ................. 2005-307834

(51) Int. Cl.
*G06F 19/00* (2006.01)
(52) U.S. Cl. ........... 700/98; 700/166; 700/782; 345/420
(58) Field of Classification Search ............. 347/224; 345/420; 700/166, 98, 180, 182; 33/21.4
See application file for complete search history.

(56) References Cited

U.S. PATENT DOCUMENTS

| 4,864,112 | A | | 9/1989 | Imai et al. |
| 4,978,202 | A | * | 12/1990 | Yang ................. 349/15 |
| 5,001,718 | A | | 3/1991 | Burrows et al. |
| 5,067,086 | A | | 11/1991 | Yamazaki et al. |
| 5,646,765 | A | | 7/1997 | Laakmann et al. |
| 5,660,747 | A | | 8/1997 | Drouillard et al. |
| 5,864,114 | A | | 1/1999 | Fukuda |

(Continued)

FOREIGN PATENT DOCUMENTS
JP 62-263889 11/1987
(Continued)

OTHER PUBLICATIONS

Office Action issued by the U.S. Patent and Trademark Office in corresponding U.S. Appl. No. 11/769,131 dated Nov. 13, 2009 (14 pages).

(Continued)

*Primary Examiner* — Michael D Masinick
*Assistant Examiner* — Sheela S Rao
(74) *Attorney, Agent, or Firm* — Kilyk & Bowersox, P.L.L.C.

(57) ABSTRACT

A three-dimensional processing data setting system comprises an information input device for inputting information on a shape of a three-dimensional work surface to be processed and information on a processing pattern to be specified, a display for displaying a work surface representing the shape information virtually in three dimensions thereon, and a coordinate conversion means for converting data describing the pattern information in two dimensions to three-dimensional space coordinate data so that a pattern representing the pattern information virtually matches with the work surface on the display, thereby generating and setting the three-dimensional processing data.

27 Claims, 33 Drawing Sheets

U.S. PATENT DOCUMENTS

| | | | |
|---|---|---|---|
| 5,897,797 | A | 4/1999 | Drouillard et al. |
| 6,043,452 | A | 3/2000 | Bestenlehrer |
| 6,180,914 | B1 | 1/2001 | Jones et al. |
| 6,210,401 | B1 | 4/2001 | Lai |
| 6,344,625 | B1 | 2/2002 | Kim et al. |
| 6,438,445 | B1 | 8/2002 | Yoshida et al. |
| 6,469,729 | B1 | 10/2002 | Ryan |
| 6,483,071 | B1 | 11/2002 | Hunter et al. |
| 6,552,300 | B1* | 4/2003 | Kerner ................ 219/121.68 |
| 6,594,926 | B1* | 7/2003 | Wujciga .................... 40/200 |
| 6,617,544 | B1* | 9/2003 | Tsukamoto et al. ..... 219/121.79 |
| 6,888,542 | B1 | 5/2005 | Clauss |
| 7,069,108 | B2* | 6/2006 | Saarela et al. ................ 700/193 |
| 7,380,717 | B2 | 6/2008 | Lubow |
| 7,705,870 | B2 | 4/2010 | Sato |
| 2001/0031960 | A1 | 10/2001 | Kliewer et al. |
| 2001/0044668 | A1* | 11/2001 | Kimbrough et al. .......... 700/118 |
| 2003/0057609 | A1* | 3/2003 | Ratcliffe ...................... 264/400 |
| 2005/0049500 | A1 | 3/2005 | Babu et al. |
| 2005/0205781 | A1 | 9/2005 | Kimba |
| 2006/0066877 | A1 | 3/2006 | Benzano |
| 2006/0089747 | A1 | 4/2006 | Sakai |
| 2006/0118733 | A1* | 6/2006 | Kiyohara et al. .......... 250/491.1 |
| 2006/0180582 | A1 | 8/2006 | Andreasch et al. |
| 2006/0228525 | A1* | 10/2006 | Dakowski .................... 428/172 |
| 2007/0086822 | A1* | 4/2007 | Sato ............................ 400/129 |
| 2007/0252006 | A1 | 11/2007 | Heck et al. |
| 2008/0011854 | A1 | 1/2008 | Idaka |
| 2008/0017619 | A1 | 1/2008 | Yamakawa et al. |
| 2008/0023455 | A1 | 1/2008 | Idaka et al. |
| 2008/0067251 | A1 | 3/2008 | Yoshimoto et al. |

FOREIGN PATENT DOCUMENTS

| | | |
|---|---|---|
| JP | 02-198412 | 8/1990 |
| JP | 07-116869 | 5/1995 |
| JP | 10-058167 | 3/1998 |
| JP | 10-085962 | 4/1998 |
| JP | 10-296466 | 11/1998 |
| JP | 11028586 | 2/1999 |
| JP | 2000-202655 | 7/2000 |
| JP | 2000-339011 | 12/2000 |
| JP | 2003-136260 | 5/2003 |
| JP | 2004-114112 | 4/2004 |
| JP | 2005175566 A | 6/2005 |
| JP | 2005-177839 | 7/2005 |
| JP | 2005-238327 | 9/2005 |
| JP | 2006007257 A | 1/2006 |
| WO | 2005046926 A1 | 5/2005 |
| WO | 2006061959 A1 | 6/2006 |

OTHER PUBLICATIONS

Office Action issued by the U.S. Patent and Trademark Office in corresponding U.S. Appl. No. 11/769,131 dated Jun. 3, 2010 (10 pages).

Office Action issued by the U.S. Patent and Trademark Office in corresponding U.S. Appl. No. 11/770,104 dated Sep. 17, 2009 (17 pages).

Office Action issued by the U.S. Patent and Trademark Office in corresponding U.S. Appl. No. 11/770,104 dated May 26, 2010 (16 pages).

Office Action issued by the U.S. Patent and Trademark Office in corresponding U.S. Appl. No. 11/855,448 dated Jun. 23, 2009 (16 pages).

Office Action issued by the U.S. Patent and Trademark Office in corresponding U.S. Appl. No. 11/855,448 dated Mar. 10, 2010 (15 pages).

Office Action issued by the U.S. Patent and Trademark Office in corresponding U.S. Appl. No. 11/770,104 dated Dec. 17, 2010 (26 pages).

Office Action issued by the U.S. Patent and Trademark Office in corresponding U.S. Appl. No. 11/828,505 dated Feb. 7, 2011 (15 pages).

Office Action issued by the U.S. Patent and Trademark Office in corresponding U.S. Appl. No. 11/770,104 dated Aug. 12, 2011, nineteen pages.

* cited by examiner

THREE DIMENSIONAL PROCESSING DATA SETTING SYSTEM, METHOD FOR SETTING THREE-DIMENSIONAL PROCESSING DATA, COMPUTER PROGRAM FOR SETTING THREE-DIMENSIONAL PROCESSING DATA, MEDIUM WITH THREE-DIMENSIONAL PROCESSING DATA STORED THEREIN THAT IS READABLE BY COMPUTER AND LASER PROCESSING EQUIPMENT OPERATED BY THE THREE-DIMENSIONAL DATA

BACKGROUND OF THE INVENTION

1. Field of the Invention

The present invention relates to a three-dimensional processing data setting system for setting three-dimensional data of a processing pattern for a laser marking equipment for processing a three-dimensional work surface with a laser beam, in particular a three-dimensional work surface, such as a laser marking machine for printing a work surface, a method for setting the three-dimensional data, a computer program for setting the three-dimensional data and a recording medium with the three-dimensional data recorded thereon readable by a computer, and a laser marking equipment.

2. Description of Related Art

A laser marking equipment scans a specified scan field of a work such as parts and products with a laser beam so as thereby to perform processing, such as printing and marking, the work surface.

FIG. 1 is a diagram illustrating a laser marking machine. The laser marking machine comprises a scan control processing 1, a laser marking processing 2 and an input processing 3. Excitation light generated by an excitation processing 6 of the scan control processing 1 excites a laser medium 8 of the laser marking processing 2. A laser beam emanating from the laser medium 8 is expanded in diameter by a beam expander 53 and directed toward a scanner processing 9 by a reflection mirror 54. The scanner processing 9 deflects the laser beam L so as to scan a work surface WS, thereby processing, i.e. marking or printing, the work surface WS. page 3 line 3-8 A1

FIG. 2 schematically shows the scanner processing 9. The scanner processing 9 comprises X, Y and Z-axis scanning devices comprising galvanometer mirrors 14a and 14b associated with galvanometer motors 51a and 51b, respectively. The X-axis and the Y-axis scanning device which are arranged so that their optical axes across perpendicularly to each other scan a scan field in X-axis and Y-axis directions, respectively. The laser beam L is focused on the work surface by an fθ lens 15.

Aside from such the laser marking machine capable of scanning a plane scan field, there has been developed a laser marking machine capable of adjusting a focal distance of a laser beam as described in, for example, Unexamined Japanese Patent Publication No. 2000-202655. As shown in FIG. 3, this laser marking machine is adapted to vary a spot size of a laser beam incident upon an object lens system 20 by axially moving an expander lens 28. In other words, laser marking machine is capable of sharply focusing the laser beam on a work surface WS irrespective of a distance of the work W from the laser source 27. A moving distance of the expander lens 28 is determined on the basis of the correlation between a shift distance of a galvanometer scanner 21 and a change in laser beam spot size. Specifically, in FIG. 3, a spot size of the laser beam on the work surface WS is measured when the galvanometer scanner 21 is at a reference position which is farthermost from the laser source 27 and, subsequently, when the galvanometer scanner 21 is moved to a position at any axial distance. As a change in spot size and an axial distance of the galvanometer scanner 21 from the reference position are in proportionality relation, the focal distance of the laser beam varies with a change in the axial distance of the galvanometer scanner 21 from the reference position. Therefore, the laser beam is always focused on the work surface WS irrespective of a distance of the work surface from the galvanometer scanner 21. The laser marking machine equipped with the focal distance adjusting mechanism realizes processing of a work surface in three dimensions, namely X-axis, Y-axis and Z-axis directions.

However, the laser marking machines capable of performing processing in three dimensions requires a user to specify a processing pattern, for example a print pattern comprising a character string, in three dimensions, because works processed by the machine have three-dimensional surfaces. Conventionally, when specifying a work pattern in three dimensions for an NC machine tool capable of performing three-dimensional machine work, a user is essentially required to specify a machine work pattern on the basis of two-dimensional engineering drawings of a work model and a machine work pattern by hand. In order to prepare control data of three-dimensional machine work accurately and effectively by hand, the user is required to have a lot of skill. The hand preparation of control data has a definite ceiling to time saving. In consequence, the laser marking machine is hard to adapt itself to multiproduct early delivery products and multi development and trial production due to a lack of human resources and working hours.

Contrary to this, there is a method using an application program for data preparation that is adapted to automatically generate control data for beam position, a work position and a work angle on the basis of a three-dimensional work model prepared by a CAD system. However, this method encounters various problems for data input such as diverse items to be specified by a user, a demand for specialized parameters and, in consequence, is hard to make data setting easy. In particular, since data of a three-dimensional work surface should be provided by a dedicated 3D-CAD system, it is hard to specify a three-dimensional work surface by the use of other application software. Furthermore, because a three-dimensional work surface and a three-dimensional shape of a processing pattern are different, they must be specified separately. That is, it is necessary to generate data for three-dimensional processing by reading in data of a three-dimensional work surface and data of a three-dimensional processing pattern from a 3D-CAD system, separately. However, since it is too troublesome for a user, in particular for an unaccustomed user, to input data of a processing pattern in consideration of three-dimensional shape.

The laser marking machine, specifically a laser marking machine, is also required to be capable of printing not only in already existing fonts but also in user-installed fonts. The already existing fonts are used for preventing the possibility of variations in print quality in accordance with character compositions resulting from different writing orders and turgidity at joints and intersecting points between lines and loops forming the respective characters. However, in the case of printing characters in three dimensions, since a character itself is printed in three dimensions, a printing surface of the character does not always reflect the font face. In consequence, dedicated processing data peculiar to printing patterns, namely character strings, should be provided by printing location. Even in the case, for example, a character string is pasted to a work surface by the use of a function of a 3D-CAD system and data of the pasted character string is downloaded to the laser marking machine, data of various different character strings are required in accordance with printing locations of the work surface, so that a flood of data is required to be prepared. In particular, when character strings include different characters giving a date at the same positions, the number of data sets is equal to the number of printing locations times the number of printing patterns by work surface. It is quite hard for a user and impractical to generate such a huge number of data sets.

SUMMARY OF THE INVENTION

It is therefore an object of the present invention to provide a three-dimensional processing data setting system, a method and a computer program for setting three-dimensional data of a processing pattern for a laser marking equipment which processes a three-dimensional work surface with a laser beam, in particular a three-dimensional work surface, such as a laser marking machine for printing a character string on a three dimensional work surface.

It is another object of the present invention to provide a recording device with the tree-dimensional stored thereon that is readable by a computer.

It is a further object of the present invention to provide a laser marking equipment capable of processing a three-dimensional work surface with a laser beam.

According to an aspect of the present invention, a three-dimensional processing data setting system for setting three-dimensional processing data for driving a laser marking device to process a three-dimensional work surface in a specified processing pattern with a laser beam focused on the three-dimensional work surface comprises information input means for inputting profile information on the three-dimensional work surface to be processed and pattern information on a processing pattern to be specified, display means for displaying a work surface representing the profile information virtually in three dimensions thereon, and coordinate conversion means for converting data describing the pattern information in two dimensions to three-dimensional space coordinate data so that a pattern representing the pattern information virtually matches with the work surface on the display means, thereby generating and setting the three-dimensional processing data. With this three-dimensional processing data setting system, a work surface and a processing pattern to be applied to the work surface are individually specified. Consequentially, a user can read the picture of processing and is enabled to set three-dimensional processing data appropriately for a laser marking equipment.

The three-dimensional processing data setting system may further comprises adjusting means for virtually superposing the processing pattern on the work surface on the display means and adjusting the three-dimensional space coordinate data of the processing pattern for desired superposition between the work surface and the processing pattern. This feature enables prior ascertainment of a layout of a processing pattern on a work surface and gives a user the opportunity to make fine adjustment.

According to another aspect of the present invention, a method for setting three-dimensional processing data for driving a laser marking device to process a three-dimensional work surface in a specified processing pattern with a laser beam focused on the three-dimensional work surface comprises the steps of inputting profile information on the three-dimensional work surface to be processed and displaying virtually a three-dimensional work surface representing the profile information of the three-dimensional work surface as appropriate, inputting pattern information on the processing pattern to be specified, converting data describing the pattern information in two dimensions to three-dimensional space coordinate data so that a processing pattern representing the pattern information virtually matches with the work surface on the display means, virtually superposing the processing pattern on the work surface on the display means, and adjusting the three-dimensional space coordinate data of the processing pattern for desired superposition between the work surface and the processing pattern as appropriate, thereby generating and setting the three-dimensional processing data. This three-dimensional processing data setting method enables a user to specify a work surface and a processing pattern to be applied to the work surface individually and, consequentially, to read the picture of processing prior to setting three-dimensional processing data for a laser marking equipment. Specifically, in the tree-dimensional processing data setting method, the step of inputting the profile information may comprise either one of a method for specifying at least a shape of a three-dimensional work surface using three-dimensional shape templates included with a program which enables data entry of a three-dimensional work surface, a method for prompting a user to input shape parameters for specifying at least a shape of a three-dimensional work surface to be processed interactively, a method for importing a data file of at least a shape of a three-dimensional work surface to be processed, and a method for acquiring data of at least a shape of a three-dimensional work surface to be processed by actually reading in information of the three-dimensional work surface by a sensor. This method enables a user to specify a work surface and a processing pattern to be applied to the work surface individually and, consequentially, to read the picture of processing and to set three-dimensional processing data appropriately for a laser marking equipment. This method further enables a user to specify information on a processing pattern in three dimensions comparatively easily.

The three-dimensional processing data setting method may comprise the steps of specifying parameters of a space position and a shape of a processing pattern so that the processing pattern matches with a three-dimensional work surface, displaying the processing pattern based on the parameters specified on a display means, and adjusting three-dimensional space coordinates of the processing pattern for desired superposition between the work surface and the processing pattern. In three-dimensional processing data setting method, the step of specifying the parameters may comprise at least one of a method for importing the parameters from a program which enables data entry of a three-dimensional work surface, a method for importing the parameters through data communication with an external equipment, and a method for importing the parameters from a data file. This method enables a user to specify information on a processing pattern directly and comparatively easily without specifying a work surface to which the processing pattern is applied. Further, the three-dimensional processing data setting method may include the step of performing processing of a work surface based on the three-dimensional processing data on trial basis. This feature enables a user to ascertain whether the setting of three-dimensional processing data turns out to be desired and to adjust the setting depending on the result.

According to another aspect of the present invention, a program for setting three-dimensional processing data for driving a laser marking device to process a three-dimensional work surface in a specified processing pattern with a laser beam focused on the three-dimensional work surface comprises a function of inputting profile information on the three-dimensional work surface to be processed and displaying virtually a three-dimensional work surface representing the profile information of the three-dimensional work surface as appropriate, a function of inputting pattern information on the processing pattern to be specified, a function of converting data describing the pattern information in two dimensions to three-dimensional space coordinate data so that a processing pattern representing the pattern information virtually matches with the work surface on the display means, a function of virtually superposing the processing pattern on the work surface on the display means, and a function of adjusting the three-dimensional space coordinate data of the processing pattern for desired superposition between the work surface and the processing pattern as appropriate, thereby generating and setting the three-dimensional processing data. With this three-dimensional processing data setting program, a user is enabled to specify a work surface and a processing pattern to be applied to the work surface individually and, consequentially, to read the picture of processing and to set three-dimensional processing data appropriately for a laser marking equipment.

The three-dimensional processing data setting program may comprise a function of specifying parameters of a space position and a shape of a processing pattern so that the processing pattern matches with a three-dimensional work surface, a function of displaying the processing pattern based on the parameters specified on a display means, and a function of adjusting three-dimensional space coordinates of the processing pattern for desired superposition between the work surface and the processing pattern. This program enables a user to specify information on a processing pattern directly without specifying a work surface to which the processing pattern is applied.

According to still another aspect of the present invention, a computer-readable storage medium or a computer-readable storage device contains the program as set forth above stored therein. Examples of the computer-readable storage medium include optical disks such as CD-ROM, CD-R, CD-RW, MO, DVD-ROM, DVD RAM, DVD-R, DVD+R, DVD-RW, DVD+RW; magnetic disks such as HD, magneto-optical disks, disks for blue-ray recording/reproducing system; semiconductor memories; flexible disks; magnetic tapes; and the like. The program may be of the type downloaded with internet access. Examples of the computer-readable storage device include general-purpose devices and dedicated devices with the program implemented in the form of software or firmware. The individual functions forming the program may be partly implemented by another computer program, or otherwise may be embodied by a specific hardware such as a gate array (FPGA, ASIC) or by a combination of program software and a partial hardware module.

According to a further aspect of the present invention, a laser marking machine for processing a tree-dimensional work surface with a laser beam focused on the three-dimensional work surface, the laser marking machine comprises a laser source for generating a laser beam, a scanner for scanning a scan field with the laser bean which comprises a beam expander for varying a focal distance of the laser beam and scanning means comprising for deflecting the laser beam emanating from the beam expander in two directions perpendicular to each other so as thereby to scan the scan field with the beam, information input means for inputting profile information on a three-dimensional work surface to be scanned and pattern information on a processing pattern to be specified, display means for displaying a work surface representing the profile information virtually in three dimensions thereon, coordinate conversion means for converting data describing the pattern information in two dimensions to three-dimensional space coordinate data so that a pattern mage representing the pattern information virtually matches with the work surface on the display means, thereby generating and setting the three-dimensional processing data, and control means for exciting the laser source and driving the scanner on the basis of the three-dimensional processing data so as thereby to process the work surface in the processing pattern. Specifically, the scanning means comprises first and second galvanometer mirrors which oscillate about axes perpendicular to each other, respectively, and the beam expander comprises a variable-focal length lens system and a galvanometer for varying a focal length of the variable-focal length lens system, whereby the scanner scans the scan field in three dimensions.

With the laser marking machine, a user is enabled to specify a work surface and a processing pattern to be applied to the work surface individually. Consequentially, a user can read the picture of processing and is enabled to set three-dimensional processing data appropriately for a laser marking equipment

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which:

FIG. 13(*b*) is an illustration showing how a laser making unit of the present invention focuses a laser beam according to processing locations in a working field;

FIG. 14(*b*) is an illustrations showing setting up of a laser marking unit of the present invention;

DETAILED DESCRIPTION OF THE PREFERRED EMBODIMENTS

In the following description, parts or mechanisms of a three-dimensional laser marking system which are not of direct importance to the invention and parts or mechanisms of the three-dimensional laser marking system which are purely of conventional construction and operation will not be described in detail since their construction and operation can easily be arrived at by those skilled in the art.

The following description is directed to a three-dimensional laser marking system by way of example in which the present invention is realized. Specifically, the three-dimensional laser marking system is explained, as a typical example, in connection with a three-dimensional laser marking system for marking or printing a print pattern on work surface. The term "print pattern" as used hereinafter shall mean and refer to characters or letters including numerals; a mark, a logotype; a graphic symbol; a pictogram; a combination of two or more of them; a character string comprising characters or a combination of one or more of them; a bar code and the like. Further, the term "processing" and "processing machine" as used hereinafter shall mean and refer to laser marking including "drilling," "trimming," "scribing," "surface finishing," and the like and "machine for performing the specific processing," respectively. In addition, the three-dimensional processing system is suitably available in the form of laser source unit for laser assisted equipments such as read-write devices for high density read/write optical disks such as DVDs and Blue-ray disks, printers, lighting systems, display devices, medical equipments and the like.

The laser marking machine may be electrically connected for data communication by means of serial transfer such as IEEE1394, RS-232x, RS422, RS423 and RS485; parallel transfer; or LAN such as 10BASE-T, 100BASE-T and 1000BASE-T to peripherals for performing operation, control, input-output, display, etc. such as a computer, a printer, an external memory device and the like. Further, the communication may be made by wireless LAN such as IEEE802.1x and OFDM or Bluetooth (registered trade name), besides by wire communication. Storage medium for data of an image and data prepared for processing include a memory card, a magnetic disk an optical disk, a magnet-optical disk, a semiconductor memory and the like.

Figure 1:
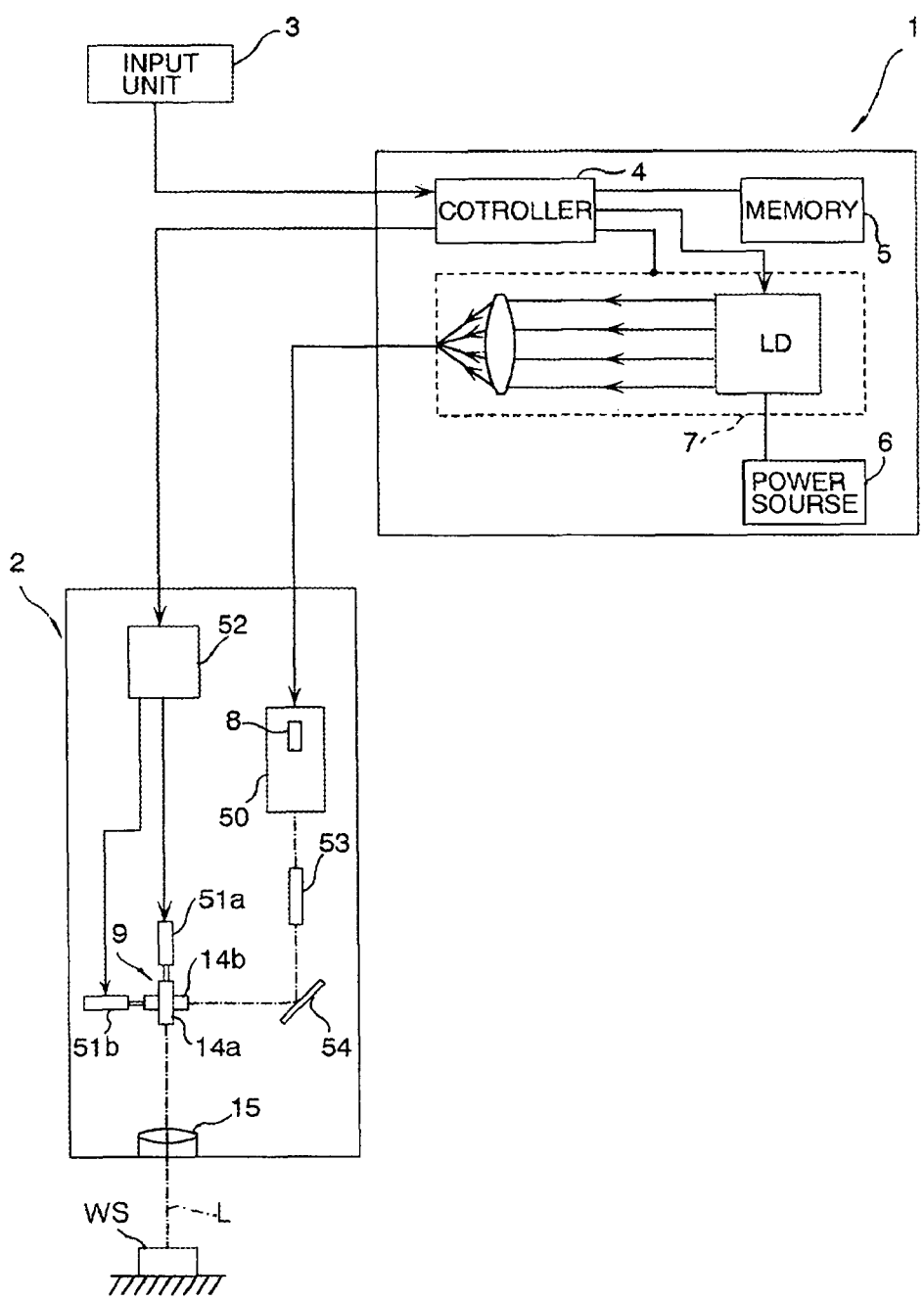
FIG. 1 is a block diagram showing a laser marking system according to an embodiment of the present invention.
Figure 2:
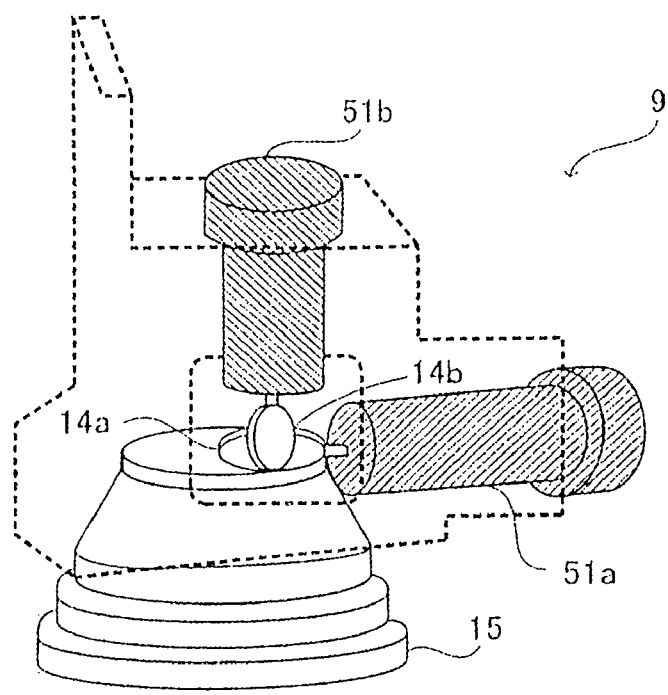
FIG. 2 is a perspective view of an X-Y scanning device of a scanner of a laser marking unit.
Figure 3:
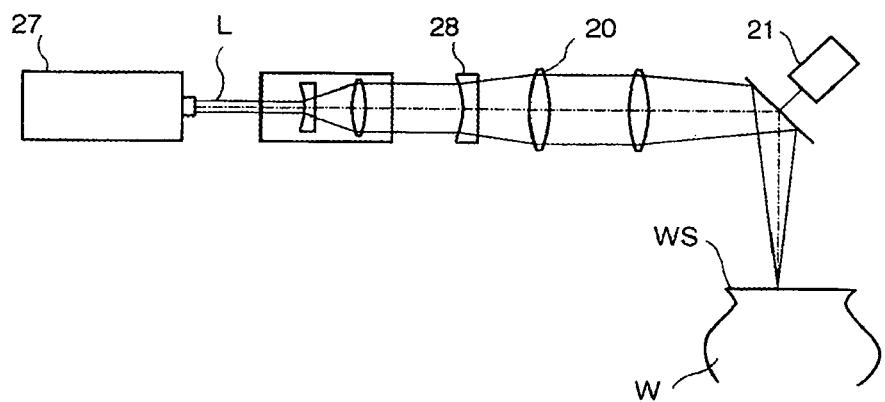
FIG. 3 is a diagrammatic illustration showing a prior art optical system for scanning laser radiation.

Referring to the accompanying drawings in detail, and in particular, to FIG. 1 showing a laser marking system, more specifically a marking or printing system, in accordance with an embodiment of the present invention, the laser marking system comprises a scan control unit 1, a laser marking unit 2 as a laser marking machine and an input unit 3. The input unit 3 sends information necessary to set data for job control of the laser marking machine to the scan control unit 1. The input unit 3 is a console including a keyboard and a display such as an LCD device or a CRT for displaying inputted information and a state of the control unit 1, and besides a mouse as appropriate. The target settings include information on operating conditions of the laser marking machine, marking job information and the like. The settings can be confirmed on the display of the input unit 3. A touch panel is available for a terminal device serving both as an input device and a display.

The scan control unit 1 comprises at least a controller 4, a memory device 5, a laser excitation unit 6 and a power source 7. The data of settings inputted by the input unit 3 and sent to the controller 4 is stored in a data storage medium of the memory device 5. The controller 4 reads out data representing the settings from the data storage medium of the memory device 5 as needed to drive the laser excitation unit 6 for excitation of a laser medium 8, such as a laser rod, of the laser marking unit 2 according to control signals representing a processing pattern such as a mark or a text to be printed. The data storage medium may be a built-in type memory, preferably a semiconductor memory such as RAM or ROM. The storage medium may be of a removable type such as a semiconductor memory card including a PC card and a SD card or a memory card including a hard disc. When the memory device 5 comprises a memory card is able to be easily rewritten by an external equipment such as a computer, data setting is performed without connecting the input unit 3 to the control unit 1 by writing the contents set by a computer in the memory card and placing the memory card in the control unit 1.

The laser marking machine is quite easily configured with the memory card placed in the memory device 5 without keying in data for desired job control through the input unit 3. Write or rewrite of data in the memory card can be easily carried out by the use of an external equipment such as a computer. It is preferred to employ, in particular, a semiconductor memory in terms of high data read/write rate, vibration-proof structure and prevention of data disappearance due to a crush.

The controller 4 provides scan signals for driving a scanner 9 of the laser marking unit 2 through a laser excitation device 6 so as to scan a work surface with a laser beam L. Specifically, the power source 7, which is a constant voltage power source, supplies a specified constant voltage to the laser excitation device 6. The scan signals for controlling a marking or print job of the laser marking unit 2 comprise pulse width modulation (PWM) signals corresponding to pulse widths of the laser beam. In this instance, the intensity of laser beam depends on a duty ratio, or on both a frequency and a scanning rate, according to a frequency of the PMW.

Figure 4:
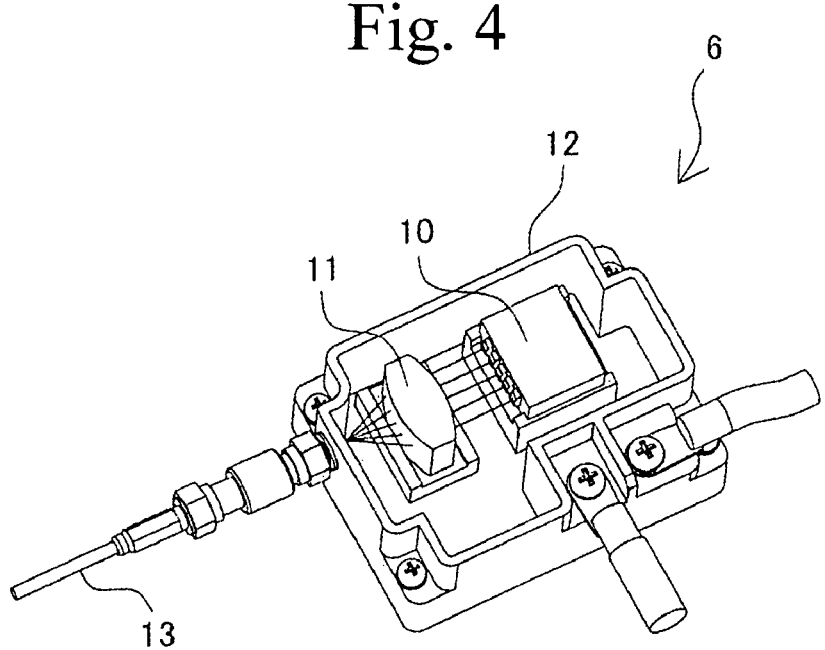
FIG. 4 is a perspective view showing an internal arrangement of a laser excitation unit.

As specifically shown in FIG. 4 by way of example, the laser excitation device 6 comprises a laser excitation light source 10 such as a semiconductor laser or a lamp and a focusing lens system (schematically depicted by a single lens) 11 fixedly installed in a casing 12. This casing 12, which is made of a metal such as brass good at thermal conduction, effectively releases heat generated by the laser excitation light source 10. The laser excitation light source 10 comprises a laser diode array made up of a plurality of laser diodes 10a arranged in a straight raw. Laser beams emanating from the respective laser diodes 10a are focused on an incident end of an optical fiber cable 13 by the focusing lens system 11 and exits as an excitation beam from the optical fiber cable 13. The optical fiber cable 13 is optically connected to the laser medium 8 directly or through a coupling fiber rod (not shown).

The laser marking unit 2 includes a laser oscillator schematically shown by a reference numeral 50 for exciting the laser medium 8 with the excitation and oscillating it to generate a laser beam L in what is called an end-pumping excitation method, a scanner 9 for scanning a working area three-dimensionally which will be described in detail in connection with FIGS. 5 to 7 later, and a drive circuit 52 for driving the scanner 9. The scanner 9 comprises X, Y and Z-axis scanning devices 14a, 14b and 14c which is built in a beam expander 54 and an fθ lens (not shown).

The laser oscillator 50 comprises, in addition to the laser medium 8, an output minor and a total reflection mirror oppositely disposed at a specified distance, an aperture disposed between these mirror and a Q-switching cell, all of which are arrange in a given path of an induced emission light. The induced emission light from the laser medium 8 is amplified by multiple reflection between the output mirror and the total reflection mirror, switched at a short cycle, selected in mode by the aperture, and then exits as a laser beam L from the laser oscillator 50 through the output mirror. The laser oscillator 50 is known in various forms and may take any form well known in the art.

The laser medium 8 used in this embodiment is an Nd—YVO$_4$ solid state laser rod which has absorption spectra whose central wavelength is 809 nm. In order to excite the Nd—YVO$_4$ solid state laser rod, the laser diodes 10a are adjusted to emit a laser beam at a wavelength of 809 nm. Solid state laser mediums available for the laser medium 8 include a rare earth-doped YAG, LiSrF, LiCaF, YLF, NAB, KNP, LNP, NYAB, NPP, GGG and the like. It is possible to convert a wavelength of laser beam from the solid state laser medium by the use of a wavelength conversion element in combination with the solid state laser medium. Further, the laser medium 8 is not bounded by a solid state laser medium and it is possible to use a gas laser such as a carbon dioxide gas laser. It is also possible to exclude the laser medium 8 by the use of a wavelength conversion element for converting a wavelength of the laser diode 10a of the laser excitation light source 10. Available examples of the wavelength conversion element include KTP(KTiPO$_4$); organic non-linear optical mediums and inorganic non-linear optical mediums such as KN(KNbO$_3$), KAP(KASpO$_4$), BBO and LBO; and bulk type polarizing-inverting element such as LiNbO$_3$, PPLN (Periodically Polled Lithium Niobate), LiTaO$_3$ and the like. Further, it is allowed to use a laser excitation semiconductor laser of an up-conversion type using a fluoride fiber doped with a rare earth such as Ho, Er, Tm, Sm, Nd and the like.

Figure 5:
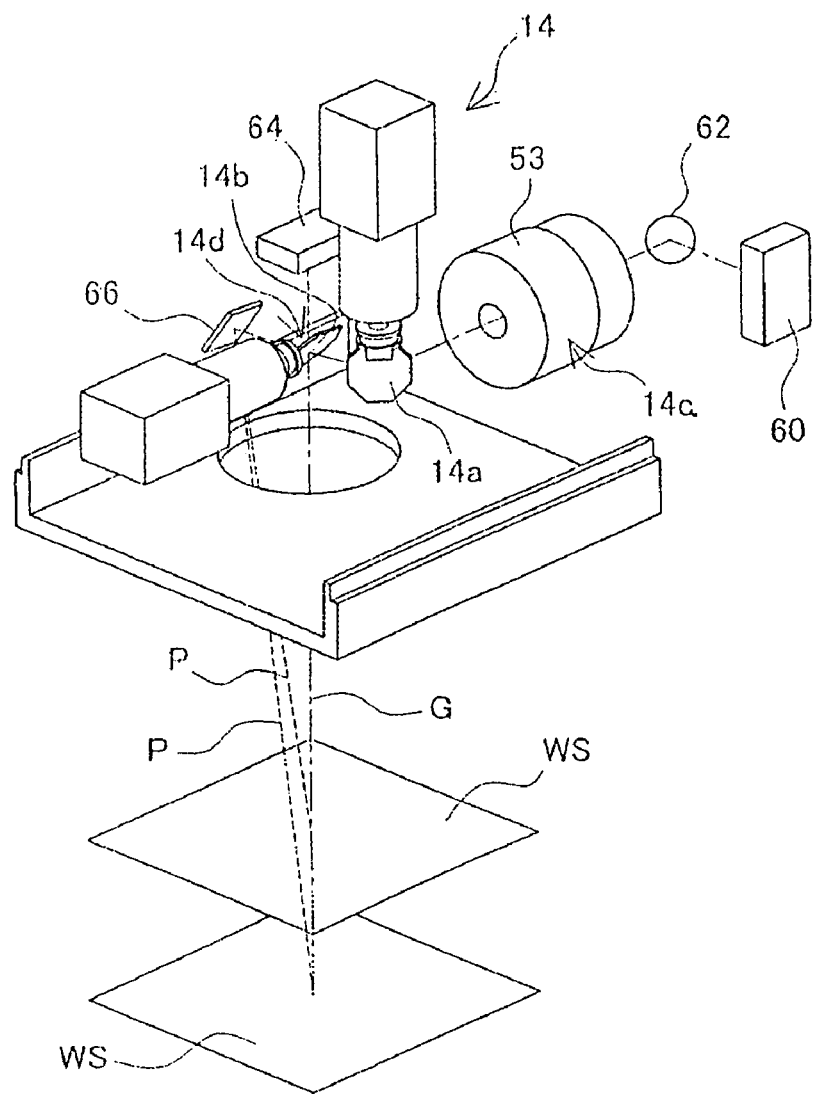
FIG. 5 is a perspective view of a laser scanner of a laser marking machine according to an embodiment of the present invention as seen from front.
Figure 6:
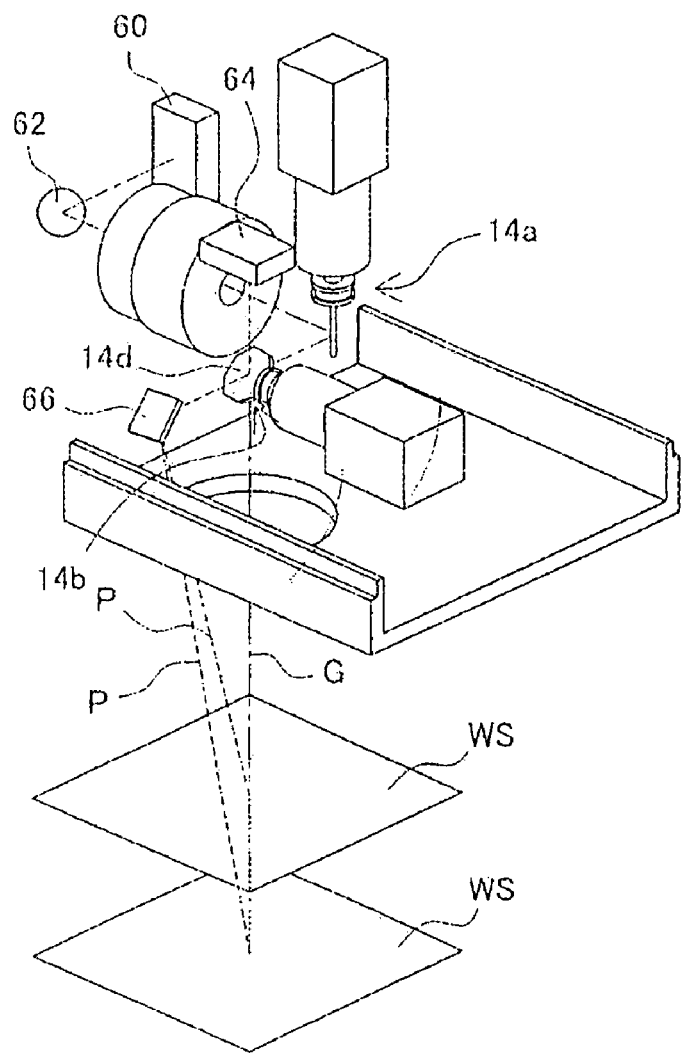
FIG. 6 is a perspective view of the laser scanner as seen from behind.
Figure 7:
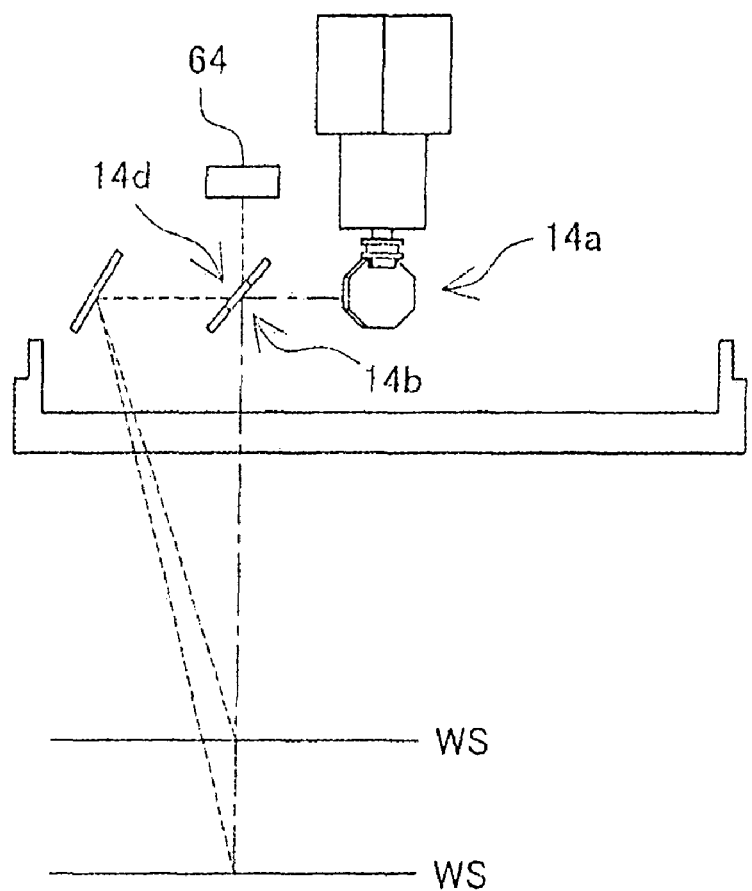
FIG. 7 is a side view of the laser scanner.

Referring to FIGS. 5 to 7, the scanner 9 comprises an X-axis scanning device 14a, a Y-axis scanning device 14b and a Z-axis scanning device 14c built in a beam expander 54. The beam expander 54 has an optical axis coaxial with the laser beam L emanating from the laser medium 8. The X-axis scanning device 14c and the Y-axis scanning device 14b have scanning directions perpendicular to each other. The Z-axis scanning device 14c has a scanning direction perpendicular to both scanning directions of the X-axis scanning device 14c and the Y-axis scanning device 14b. The X-axis scanning device 14c and the Y-axis scanning device 14b scan a working area WS tow-dimensionally with the laser beam L emanating from the laser medium 8. The Z-axis scanning device 14c scans the work area WS in an axial direction with the laser beam L by changing a focal distance of the laser beam L through the beam expander 54.

Each of the scanning devices 14a, 14b and 14c is made up of a galvanometer mirror comprising a total reflection mirror and a motor for rotating a reflective surface about an axis of a rotary shaft of the motor. The scanning device 14a, 14b, and 14c is provided with a rotational position sensor for detecting a rotational position of a rotary shaft of the motor and providing a signal representing a rotational position of the rotary shaft. The scanner drive circuit 52 (see FIG. 1) drives the X-, F- and Z-scanning devices 14a, 14b and 14c according to control signals provided by the controller 4 of the scan control unit I. For example, the scanner drive circuit 52 controls drive currents to the respective scanning devices 14a, 14b and 14c according to control signals provided by the controller 4 of the scan control unit 1. Further, the scanner drive circuit 52 has a function of adjustment of a time rate of rotational angle of the scanning device with respect to the control signal. This adjustment function can be embodied by a semiconductor element such as a variable resister operative to change parameters for the scanner drive circuit 52.

Incidentally, in the recent years, there have been developed three-dimensional laser marking machines such as laser markers that can not only scan a two-dimensional working area but also change a focal distance of a scanning laser beam. However, such a laser marker is allowed only to change a two-dimensional (flat) scan surface vertically stepwise. That is, there has been no laser marker capable of scanning or printing a curved work surface or an inclined work surface, On another front, there is a strong demand for a laser marker capable of performing high quality print on curved surfaces of, for example, cans.

Figure 8:
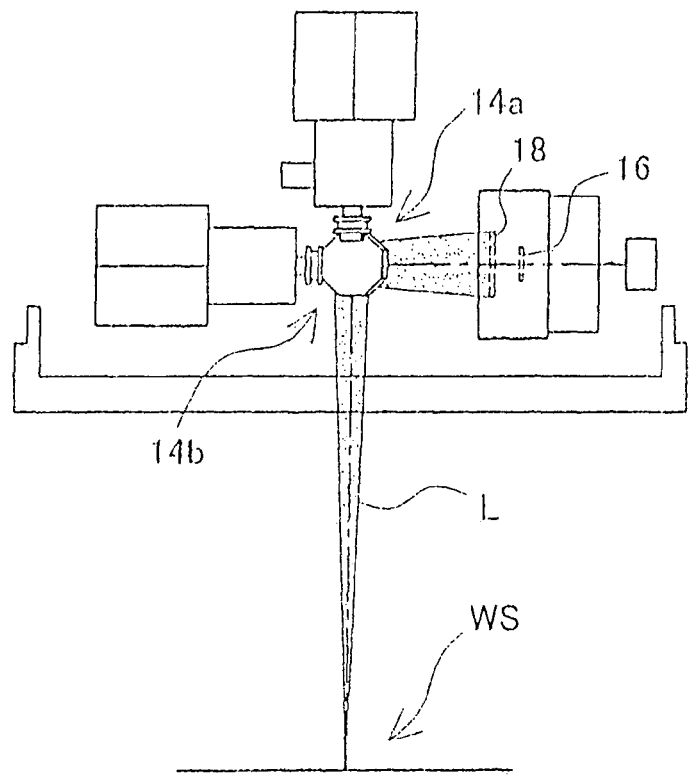
FIG. 8 is a side view of the laser scanner with a laser beam adjusted at a long focal distance.
Figure 9:
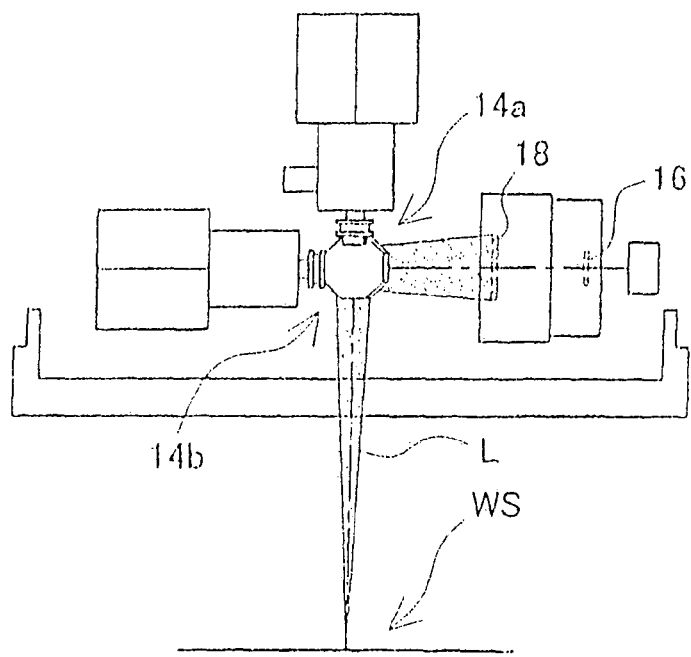
FIG. 9 is a side view of the laser scanner with a laser beam adjusted at a short focal distance.

The Z-axis scanning device 14c is accompanied by the beam expander 53 which varies a focal length so as to adjust a spot size of the laser beam L on a given working a=ea as small as possible. The expander 53, which comprises two lenses or lens groups at incident and exit sides, respectively, varies its focal length by changing a relative axial distance between the two lenses. In other words, the beam expander 53 varies a focal distance (which is hereinafter referred to as a working distance in some cases) at which a least size of beam spot of the laser beam L is formed on a given work surface. In order to effectively vary the focal distance, the beam expander 53 is disposed before the galvanometer minor of the Z-axis scanning device 14c as shown in FIG. 5. In order to provide a more specific explanation, reference is made to FIGS. 8 through 9. As shown, the Z-axis scanning device 14c includes a variable-focal length lens system comprising a movable lens or lens group 16 at an incident side and a stationary lens or lens group 18 at an exit side. The movable lens 16 is axially moved back and forth by a driving mechanism including a galvanometer (not shown). The drive mechanism includes a movable element for holding the lens 16 and a coil and magnet assembly for causing axial movement of the movable element. As shown in FIG. 8, when bringing the lenses 16 and 18 close to each other, the variable-focal length lens system changes its focal length longer, so as hereby to make a working distance longer. On the other hand, as shown in FIG. 8, when bringing the lenses 16 and 18 far away from each other, the variable-focal length lens system changes its focal length shorter, so as hereby to make a working distance shorter. In this instance, the stationary lens and the movable lens may be replaced with each other or may be both movable.

The scanner 9 provided with the Z-axis scanning device 14c thus structured in addition to the X-axis and the Y-axis scanning device 14a and 14b is capable of varying a working distance, so as thereby to scan a tree-dimensional work surface. Therefore, the laser marking machine 100 is capable of printing a three-dimensional work surface with high sharpness and precision. Giving an explanation of the printing state with reference to FIG. 10, when the prior art laser marking machine which comprises a Z-axis scanning device fixed in focal distance forms a least beam spot of the scanning beam L on a work surface W placed in an X-Y plane at a center, the least beam spot tracks a circular-arcuate path drawn with a radius equal to the focal distance. That is, the least beam spot gets away farther from the work surface W in the axial direction as the laser beam L moves away from the center of the work surface W. In other words, the beam spot becomes larger on the work surface W as the laser beam L moves away from the center of the work surface W (as shown by a laser beam L'). This represents that print quality is uneven over the work surface W. Specifically, as shown in FIG. 11(a), the printed letter becomes thicker with an increase in horizontal distance from the center of a given work field WS. That is, the beam spot is the least in a central area of the working field WS, so that lean-faced high quality printing is made in the central area. However, the beam spot becomes gradually large in the working field as coming closer to the periphery of the working field WS. In consequence, characters are in fat-faced print in outlying areas, and the print quality progressively grows worse as the printing position draws away from the center.

Figure 10:
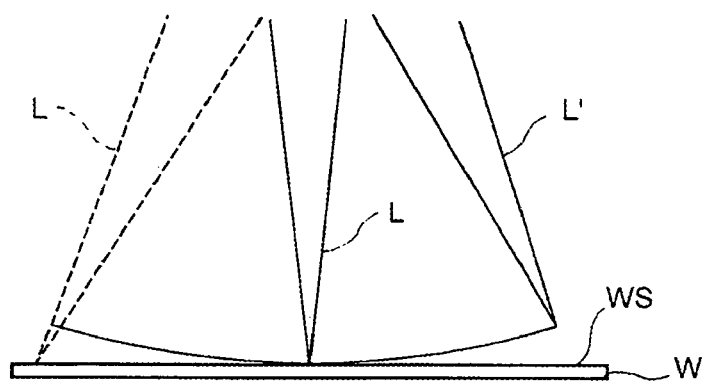
FIG. 10 is an illustration showing a focal track of a laser beam with respect to a work surface.
Figure 11A:
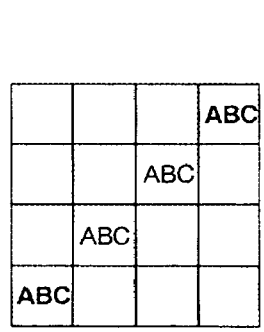
FIGS. 11(*a*) and 11(*b*) are illustrations showing how a processed condition changes according to locations in a scan field.
Figure 11B:
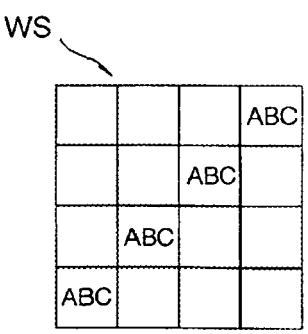

As against, according to the laser marking machine 100 provided with the Z-axis scanning device 14c that is capable of adjusting the working distance of laser beam, the laser beam is well focused on the work surface W and projects a least beam spot ranging over the whole area of the work surface W as shown by a broken line in FIG. 10. That is, the printed letter is sharp and thin irrespective of printing position, so that high quality printing is attained ranging over the whole area of the working plane WS as shown in FIG. 11(b).

Figure 12A:
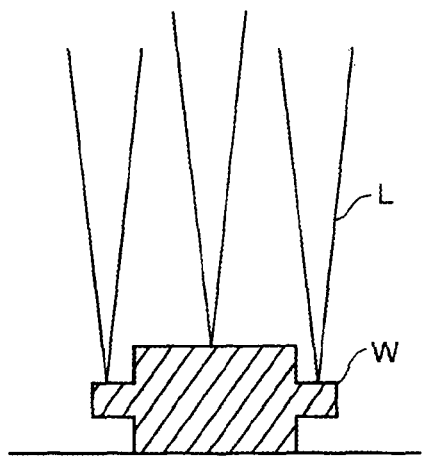
FIGS. 12(*a*), 12(*b*) and 12(*c*) are illustrations showing how a laser beam is focused according to shapes of work surface.
Figure 12B:
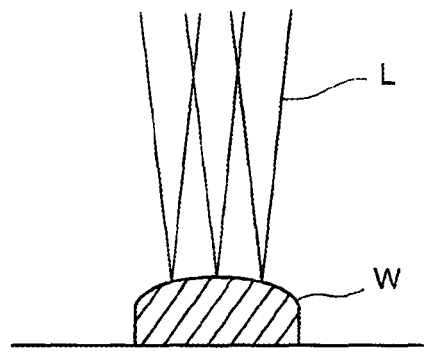
Figure 12C:
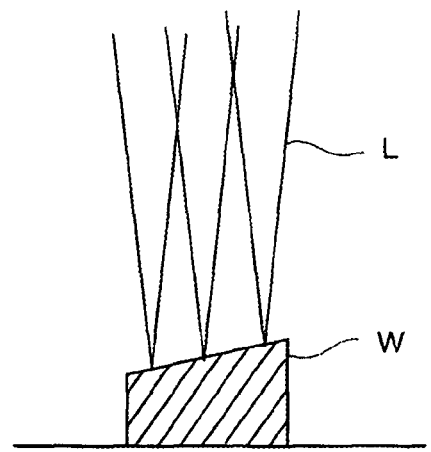

As just described, the laser marking machine 100 enables to print inscriptions on pallets or faceplates with high and stable quality. However, in the case where the laser marking machine is used for purposes other than printing such as processing articles, uniform processing quality is maintained ranging over the whole area of a work surface irrespective of surface shapes. Specifically, uniform and high quality printing or processing is performed on diversified shapes of surfaces such as a stepped work surface W shown in FIG. 12(a), a curved work surface W shown in FIG. 12(b) and an inclined work surface W shown in FIG. 12(c). Furthermore, high quality and fair finishing is realized even in deep gate cutting. The laser marking unit 2 of the laser marking machine of the present invention broadens a work area and, at the same time, performs precise marking in the broadened work area.

Figure 13A:
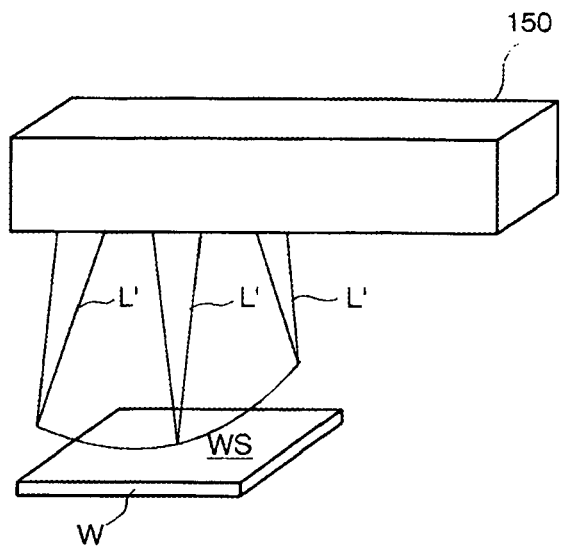
FIG. 13(*a*) is an illustration showing how a prior art laser marking unit focuses a laser beam according to processing locations in a working field.
Figure 13B:
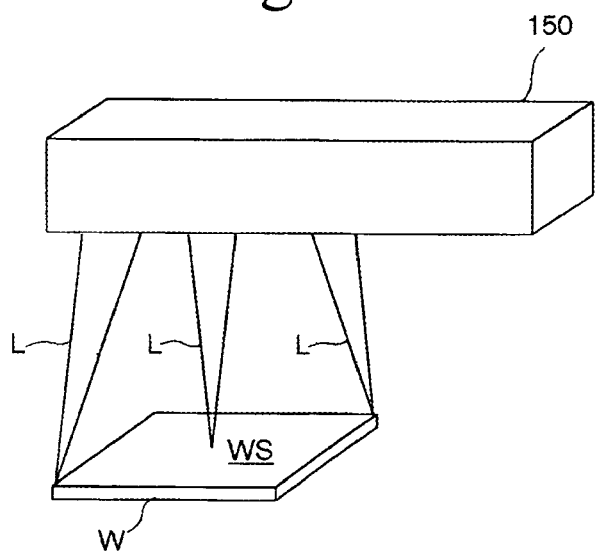

FIGS. 13(a) and 13(b) show a conventional laser marking unit 150 in which a focal distance is fixed and a laser marking unit 150 in which a focal distance is variable, respectively, for the purpose of comparative evaluation of them. As shown in FIG. 13(a), the laser marking unit 150 focuses a laser beam L' on a circular-arcuate line, so that a beam spot becomes larger on a plane work surface WS as the laser beam L' moves away from the center of the work surface WS. In light of this peculiarity, it can be said that the conventional laser marking unit 150 has no proper condition to process a broadened working area. Whereas, as shown in FIG. 13(b), the laser marking unit 150 focuses a laser beam L so as to form a least beam spot ranging over the whole area of a plane work surface WS. Therefore, the laser marking unit 150 is capable of printing inscriptions on a work surface broader than the conventional laser marking unit 150 with high and uniform print quality. The laser marking unit 2 of the laser marking machine of the present invention is simplified in positioning when it s installed or rearranged.

Figure 14A:
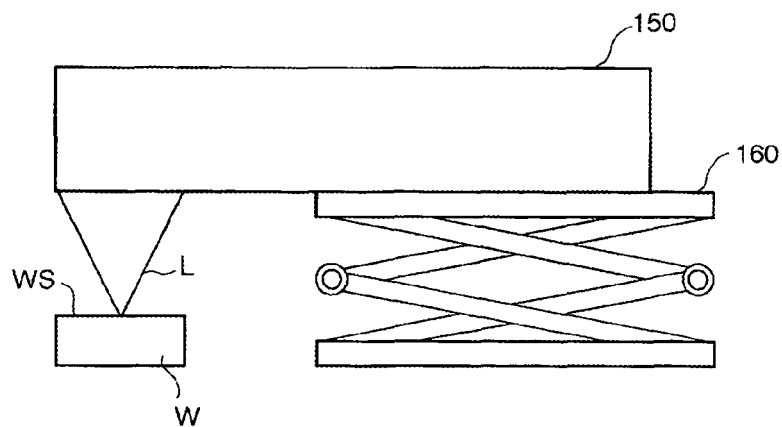
FIG. 14(*a*) is an illustrations showing setting up of a prior art laser marking unit.
Figure 14B:
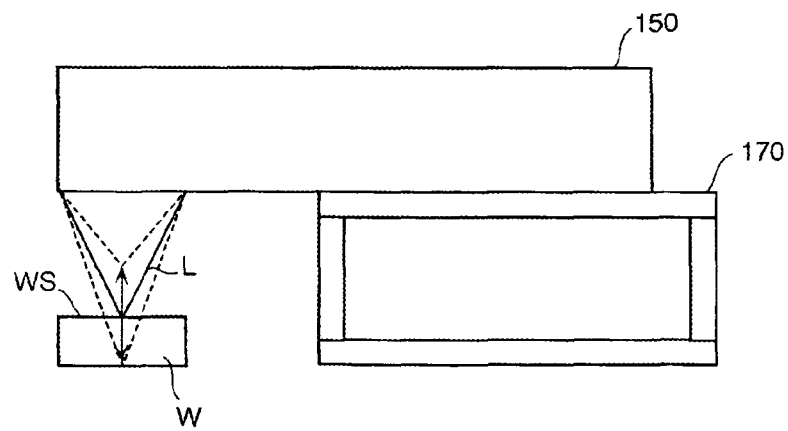

FIGS. 14(a) and 14(b) show setting up of the conventional laser marking unit 150 in which a focal distance is fixed and the laser marking unit 150 comprising the laser marking unit 2 in which a focal distance is variable. As shown in FIG. 14(a), the laser marking machine 150 is mounted on a telescopic elevating mechanism 160. The laser marking unit 150' is vertically moved up or down by telescopic motion of the elevating mechanism 160 so as to bring the focal distance into coincidence with a working distance defined by a distance between the laser marking unit 150' and a work surface W. In addition, the elevating mechanism 160 is necessarily provided with positioning means for adjusting the laser marking unit 150' in horizontal position and height in order to achieve fine printing. This conventional setting conformation makes the elevating mechanism 160 somewhat complicated and, in consequence, makes setting or rearranging operation pretty troublesome. On the other hand, as shown in FIG. 14(b), the laser marking unit 150 is mounted on a stationary pedestal 170. It is sufficiently enough to prepare the pedestal 170 having a height matched with an established standard focal distance. Therefore, the pedestal 170 has no use for position adjusting mechanism, and hence position adjustment operation not only using the laser marking unit 150 in two-dimensional print but using it in three-dimensional print.

Figure 15A:
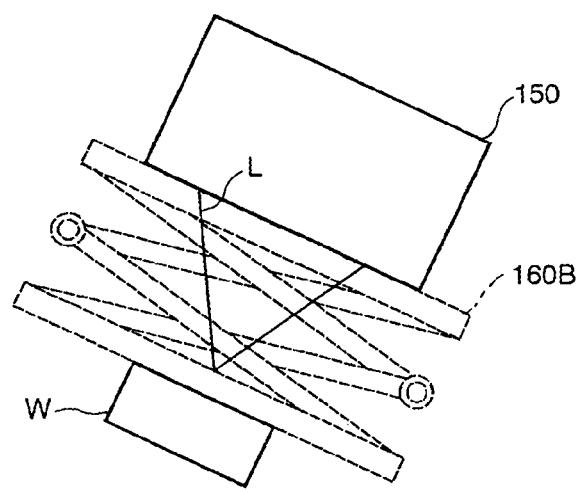
FIG. 15(*a*) is an illustrations showing inclined setting up of a prior art laser marking unit.
FIG. 15(b) is an illustrations showing inclined setting up of a laser marking unit of the present invention.
Figure 15B:
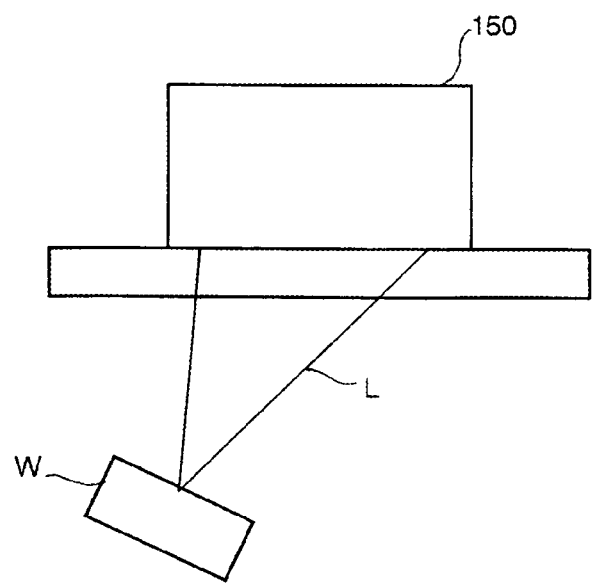

FIGS. 15(a) and 15(b) show setting conformations of the conventional laser marking unit 150' in which a focal distance is fixed and the laser marking unit 150 comprising the laser marking unit 2 in which a focal distance is variable, respectively, in the case where print is made on a work surface in a tilted position. As show in FIG. 15(a), the laser marking unit 150' is mounted on a tilting mechanism 160B. The laser marking unit 150' is tilted according to a work surface W in a tilted position by handling the tilting mechanism 160B. On the other hand, as shown in FIG. 15(b), the laser marking unit 150 is mounted on a stationary pedestal 170B. The laser marking unit 150 remaining in a horizontal position on the pedestal 170B forms a least beam spot ranging over the whole area of the work surface W.

As just described, the laser marking machine can be applied flexibly to various applications. In addition, the laser marking machine is set or rearranged quite easily and capable performing high and stable quality.

The set or rearranged state including focal position adjustment of the laser marking unit 2 or the laser marking unit 150 is carried out by the use of print samples prepared in a sample printing mode. The sample printing mode is the mode in which print samples are made with various combinations of scanning speed and laser output on trial basis. A single print sample includes multiple print patterns, each comprises a number of letters, which are printed under different printing conditions. An optimum printing condition can be specified by evaluating the print patterns of each print samples in terms of sharpness, density and thickness of letters.

Figure 16:
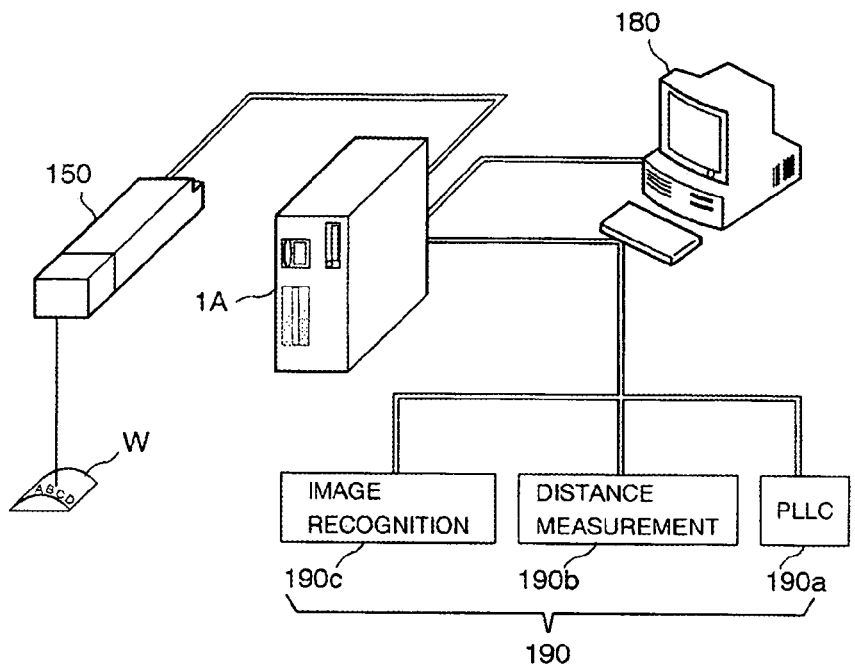
FIG. 16 is a block diagram showing a system structure of a laser marking system capable of three-dimensional printing.

FIG. 16 shows a three-dimensional laser marking system according to an embodiment of the present invention. The laser marking system comprises at last a laser marking unit 150 as a laser output unit, a marking control unit 1A connected to the laser marking unit 150 and a data setting unit 180 connected to the laser control unit 1A for data communication. In this embodiment, the marking data input unit 180 comprises a computer on which a three-dimensional processing data input program is installed. Settings of an intended three-dimensional print job including a printing pattern are inputted as three-dimensional printing data as scripted by, for example, a data input wizard. In order to perform data input, a programmable logic controller equipped with a touch panel or another specialized hardware for data input may be available. The marking data input unit 180 and the laser control unit 1A are integrated as a single computer unit.

The laser marking system is provided with external equipments such as a programmable logic controller (PLC) 190a, a displacement pickup 190b, an image recognition device 190c (which are comprehensively denoted by a reference numeral 190), a photo diode (PD) sensor and other sensors. The programmable logic controller (PLC) 190a controls the laser marking system according to a given sequence logic. The image recognition equipment 190c, which may comprise an image sensor, detects types and positions of works conveyed on a processing line. The displacement pickup 190b, which may comprises a displacement pickup device, gobbles down information on a distance between a work and the marking unit 150. These external equipments are connected to the laser control unit 1A for data communication.

Figure 17:
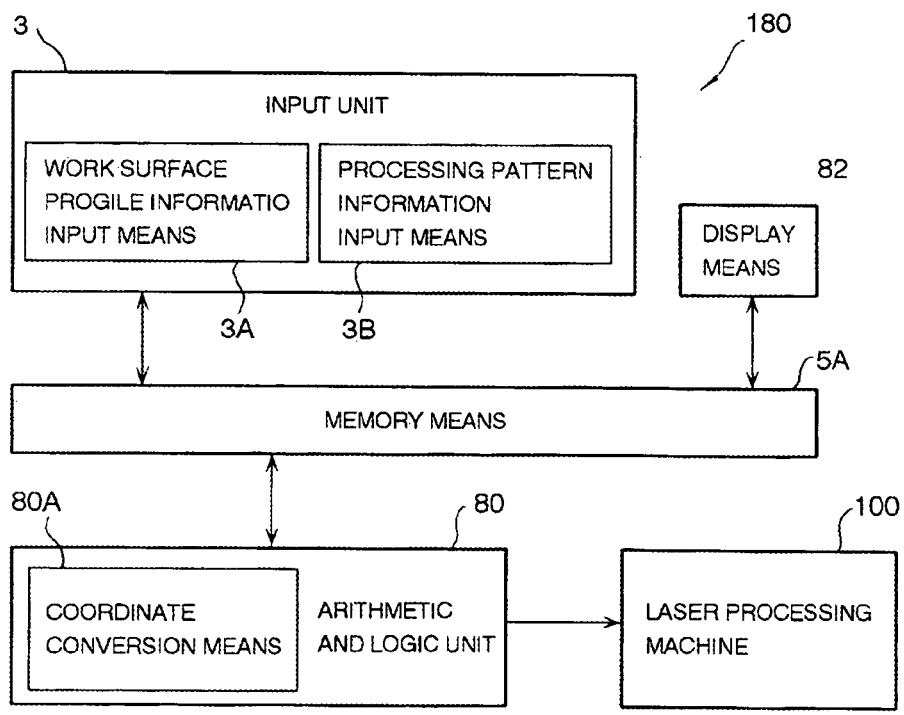
FIG. 17 is a block diagram showing a system architecture of a three-dimensional processing data setting system.

Referring to FIG. 17 showing architecture of the marking data input unit 180 by way of example, the marking data input unit 180 comprises an input unit 3 by which information on an intended three-dimensional marking job is inputted, an arithmetical and logic unit 80 operative to generate data necessary for execution of the three-dimensional printing job according to the information, and a display unit 82 for displaying the settings and the generated job data thereon, a memory device 5A. The input unit 3 has profile information input means 3A which caries out the function of inputting data representing information on a profile of a three-dimensional printing surface of a work and print pattern input means 3B which carries out the function of inputting data representing information on a print pattern. The memory device 5A, which stores data representing settings and the information on the surface profile and the print pattern, may comprise a semiconductor memory. The arithmetical and logic unit 80, which comprises a large-scale integrated circuit or an integrated circuit for data processing, has coordinate conversion means 80A for converting plane coordinate data into three-dimensional special coordinate data for a three-dimensional simulation of a print pattern according to a three-dimensional printing surface of a work.

Figure 18:
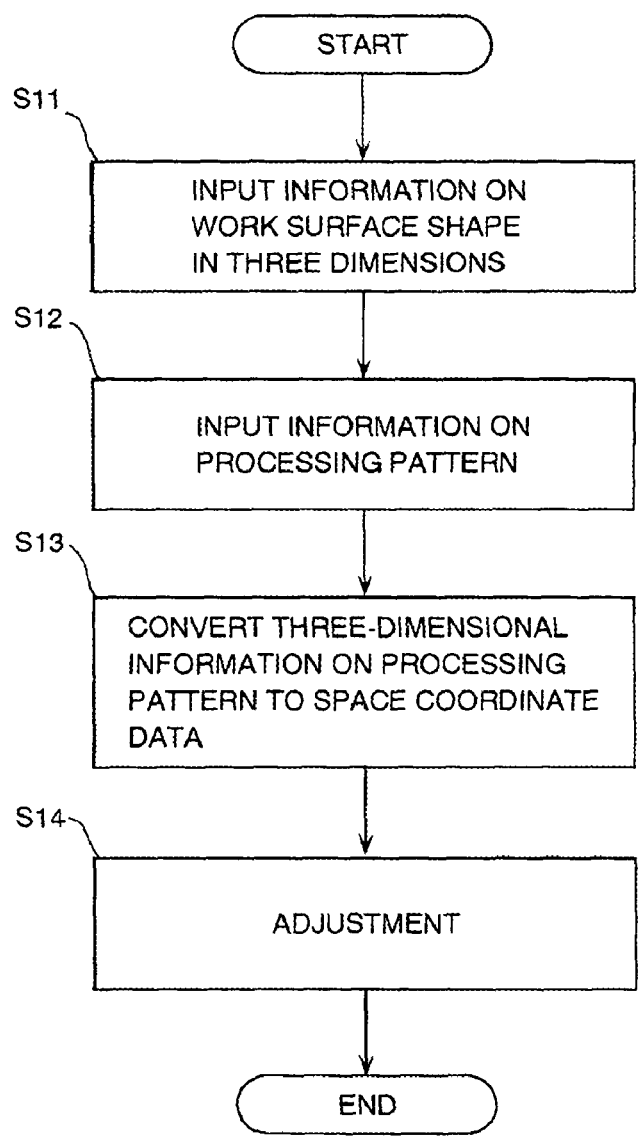
FIG. 18 is a flowchart illustrating a three-dimensional processing data setting sequence according to an embodiment of the present invention.
Figure 19:
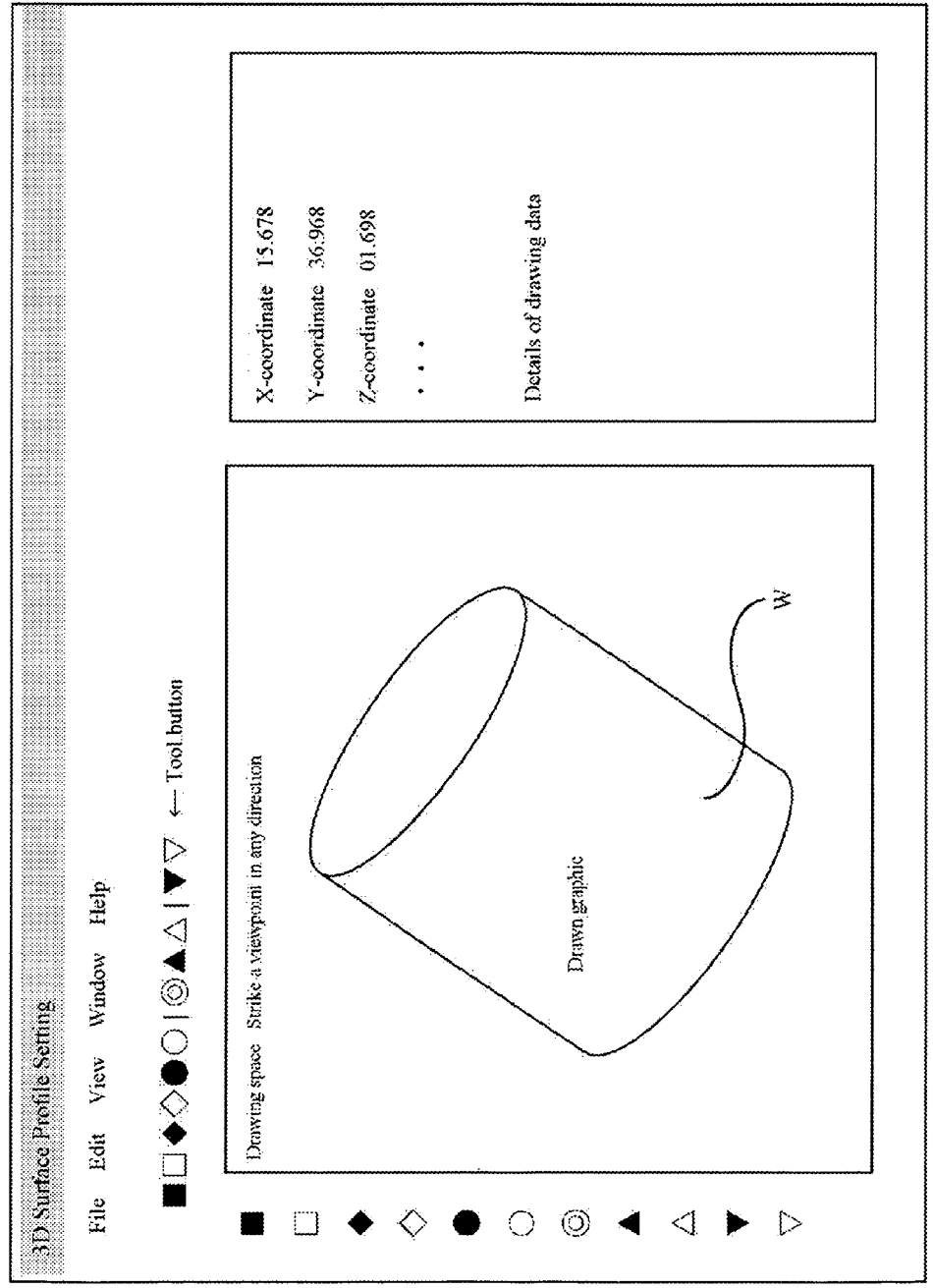
FIG. 19 is an illustration showing a user interface window for inputting a shape of a three-dimensional work surface.

FIG. 18 is a flowchart illustrating a sequence of print pattern setting for the laser marking system. In the following description reference is made to FIGS. 19 through 33 illustrating user interface windows in connection with a three-dimensional processing data setting program 200. In FIGS. 19 through 33, although the written information appearing in plain language on the interface is in the Japanese language, nevertheless, the directions concerning its use have been expressed in any language. The window is not bounded by layout, size, shape, color scheme, pattern and the like of display areas and buttons, and may be appropriately changed for eye-friendliness, easy decision and simple operation. For example, it is effective to display details in a separate window on screen or to display a plurality of windows on screen. On/Off buttons and command buttons are operated on screen through the input unit 3 connected to a computer with a three-dimensional processing data input program is installed thereon. The term "push down" a button as used hereinafter shall means "point and click" a button on screen, besides "direct touch" to a button on screen. An input device forming apart of the input unit 3 is connected to the computer by wireless communication or wire communication, or otherwise may be built in the computer. Available examples of the input device include various types of pointing devices such as a mouse, a keyboard, a slide pad, track pointer, a tablet, a joystick, a jog dial, a digitizer, a light write pen, a numerical keypad, a touch pad, etc. It is possible to use a touch panel or screen for the display unit 82 so as to enable a user to perform data input through direct touch to the touch screen. The input device can be used not only to operate a program but also to control operation of the laser marking machine. Referring to FIG. 18, when the flowchart commences, the sequence logic proceeds to step S11 to input information on a three-dimensional work to be printed through the input unit 3. In this instance, the profile information input means 3A of the input unit 3 is known various methods and may take any method. Examples of the profile input method includes (1) A method for drawing a three-dimensional work by the use of a graphic design program;
(2) A method for defining a three-dimensional work by inputting geometric parameters required to specify the three-dimensional work on a wizard window of an interactive three-dimensional graphics design program;
(3) A method for reading in one of data files of various three-dimensional works that are prepared beforehand; and
(4) A method for importing a three-dimensional work by the use of an image recognition device such as an image sensor.

FIG. 190 shows a user interface 210 of a three-dimensional graphics drawing program by way of example. In the method (1), a three-dimensional graphic image is created by a similar feeling of computer-assisted design by the use of a drawing program and tools necessary for solid modeling that are functionally similar to an existing three-dimensional CAD programs and solid modeling tools. The three-dimensional graphic image thus created is saved on a file once and then forwarded to the three-dimensional processing data setting program 200, or may be directly pasted to the three-dimensional processing data setting program 200. This method is casually used by an operator skilled in the task of three-dimensional graphics drawing and, however, is abstrusity for an operator weak in graphics drawing.

Figure 20:
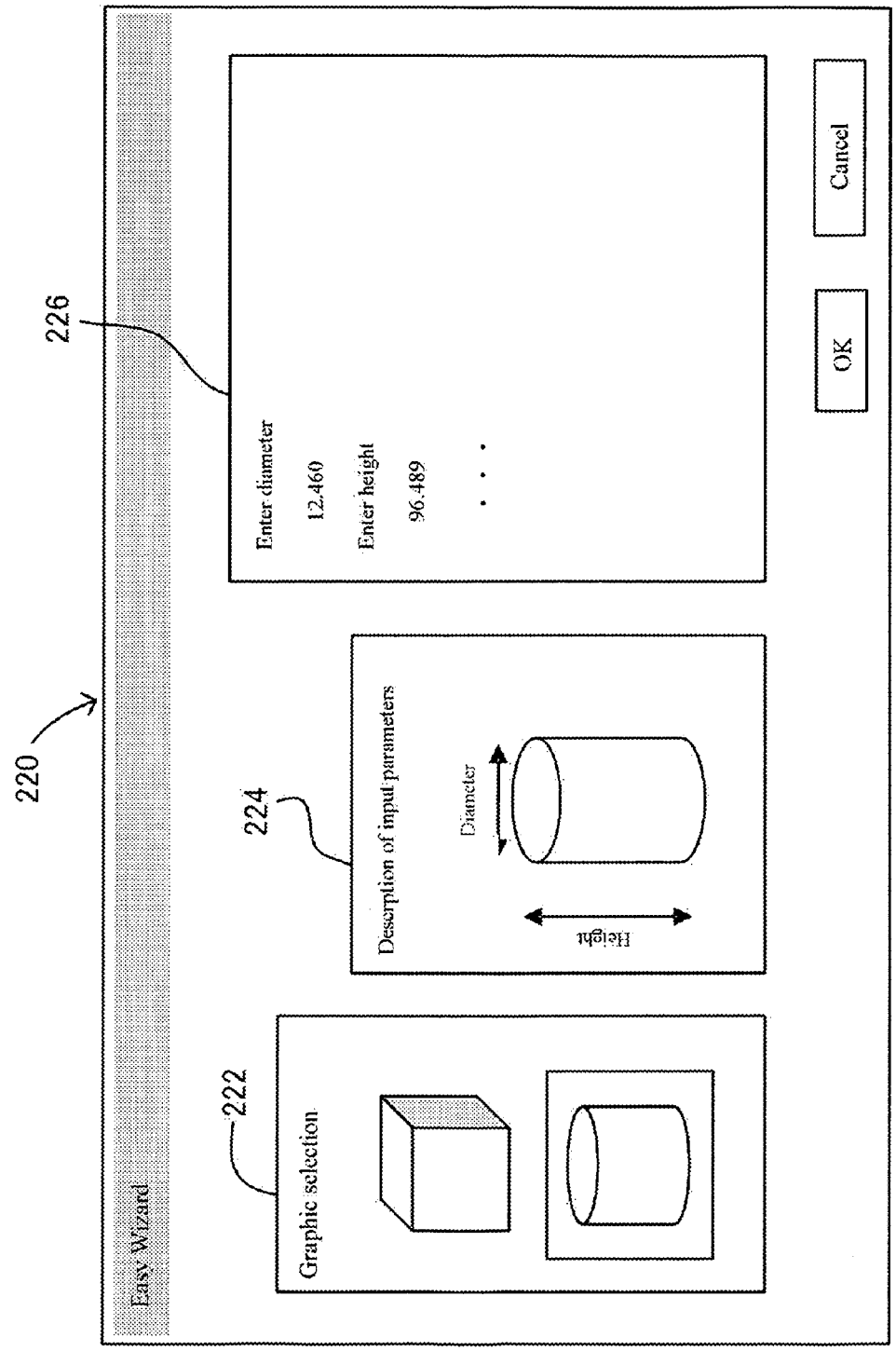
FIG. 20 is an illustration showing a wizard window for setting a shape of a work surface.

In the method (2), information is interactively input on a wizard window to define a three-dimensional graphic image. This method is casually used because of no requirement for knowledge and experience of three-dimensional graphics drawing. FIG. 20 shows a wizard window of a solid modeling in interactive three-dimensional graphics design program by way of example. This wizard window has three areas, namely a "graphic image selection" area 222 on the left, a "description of parameters" area 224 in the middle and a "parameter input" area 226 on the right. When opening the wizard window 220, there are displayed basic solid figures such as a cubic, a rectangular solid, a cylindrical column, a circular cone, a hexagonal column, other polygonal columns, a sphere, general bottles, etc. in the "graphic image selection" area 222. One of the figures, for example a cylindrical column in this example, is selected by point-and-click with a mouse. When selecting the cylindrical column, an illustration for geometric parameters required to specify a cylindrical column appears in the "description of parameters" area 224 and, at the same time, massages for inputting actual dimensions of an intentional cylindrical column appears in the "parameter input" area 226. That is, since the geometric parameters required to specify a cylindrical column include a diameter and a height, a graphic of the selected cylindrical column accompanied by required parameters, "diameter" and "height," appear in the "description of parameters" area 224. At the same time, prompting messages, "input diameter" and "input height" appears in the "parameter input" area 226. Parameters, which depend upon figures, include, for example, a length, a breadth and a height for a rectangular solid; a length of side for a cubic; a diameter or a radius of base and a height for a circular cone; a length of side and a height for a hexagonal column; a diameter or a radius for a sphere; and diameters and lengths of base and neck, respectively. The graphic image specified by the geometric parameters is saved in the memory and is pasted to the three-dimensional processing data setting program 200 for another use. Further, the created graphic image is read out and reedited by the three-dimensional processing data setting program. The created graphic image may be saved as one of three-dimensional shapes of the template which are selectable on the graphic interface.

In the method (3), a data file of a work provided by another software such as three-dimensional drawing software used in a CAD system and converted is used. Since ready-made data can be used, significant layer-saving is realized in specifying a work profile.

Figure 21:
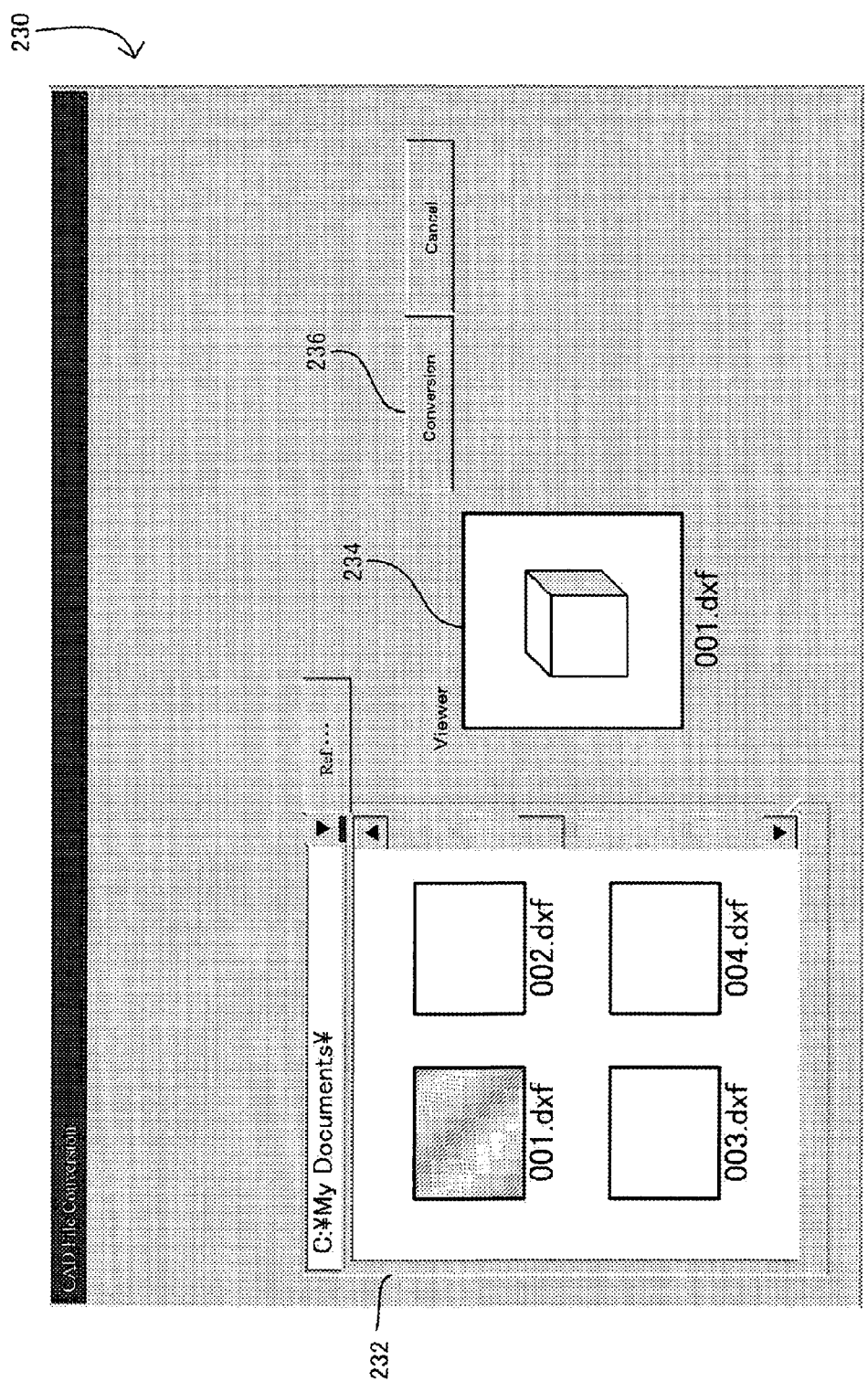
FIG. 21 is an illustration showing a user interface window of a CAD file conversion.
Figure 22:
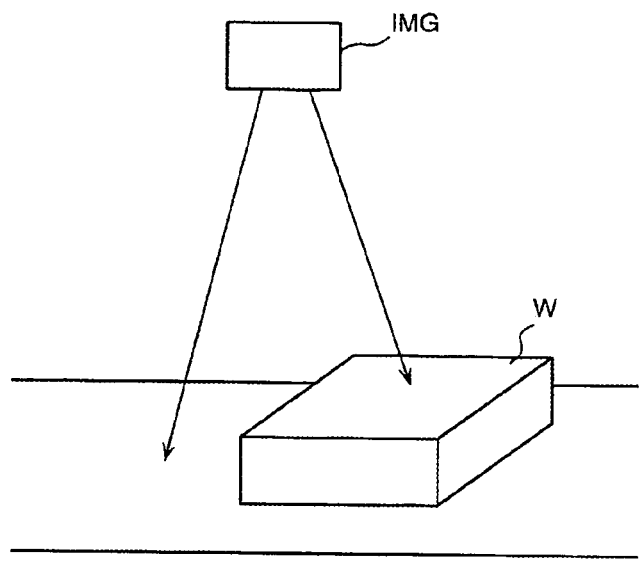
FIG. 22 is a schematic view showing detection of information on a work by an image sensor.

FIG. 21 shows a data file conversion interface 230 of a CAD data file converter by way of example. In this embodiment, the file conversion interface has a "Select File" area 232 where a user selects a file, a "Viewer" box 234 where the contents of a selected file are shown and a "Convert" button 236 which is clicked on to execute conversion of the selected file to a file format readable by the processing data setting program 200. Examples of the file format readable in the data file conversion interface 230 include various general-purpose file formats such as DXF, IGES, STEP, STL, GKS, etc. Further, it is possible to utilize a file format such as DWG exclusive to a specific application program.

In the method (4), data of a work is automatically acquired by image recognition by the use of, for example, an image sensor. This method does not require knowledge and experience about three-dimensional drawing practice and data file. Only a thing to acquire data is to execute an onscreen instruction which can acquire data of a surface profile of a work W readable by an image sensor IMG. The image sensor IMG may be replaced with a CCD camera, a C-MOS camera and the like. It is possible to acquire data of a surface profile from a picture of a work W through a scanner. An image recognition algorithm for providing a profile representation from image data is known in various forms and take any image recognition algorithm well known in the art.

Figure 23:
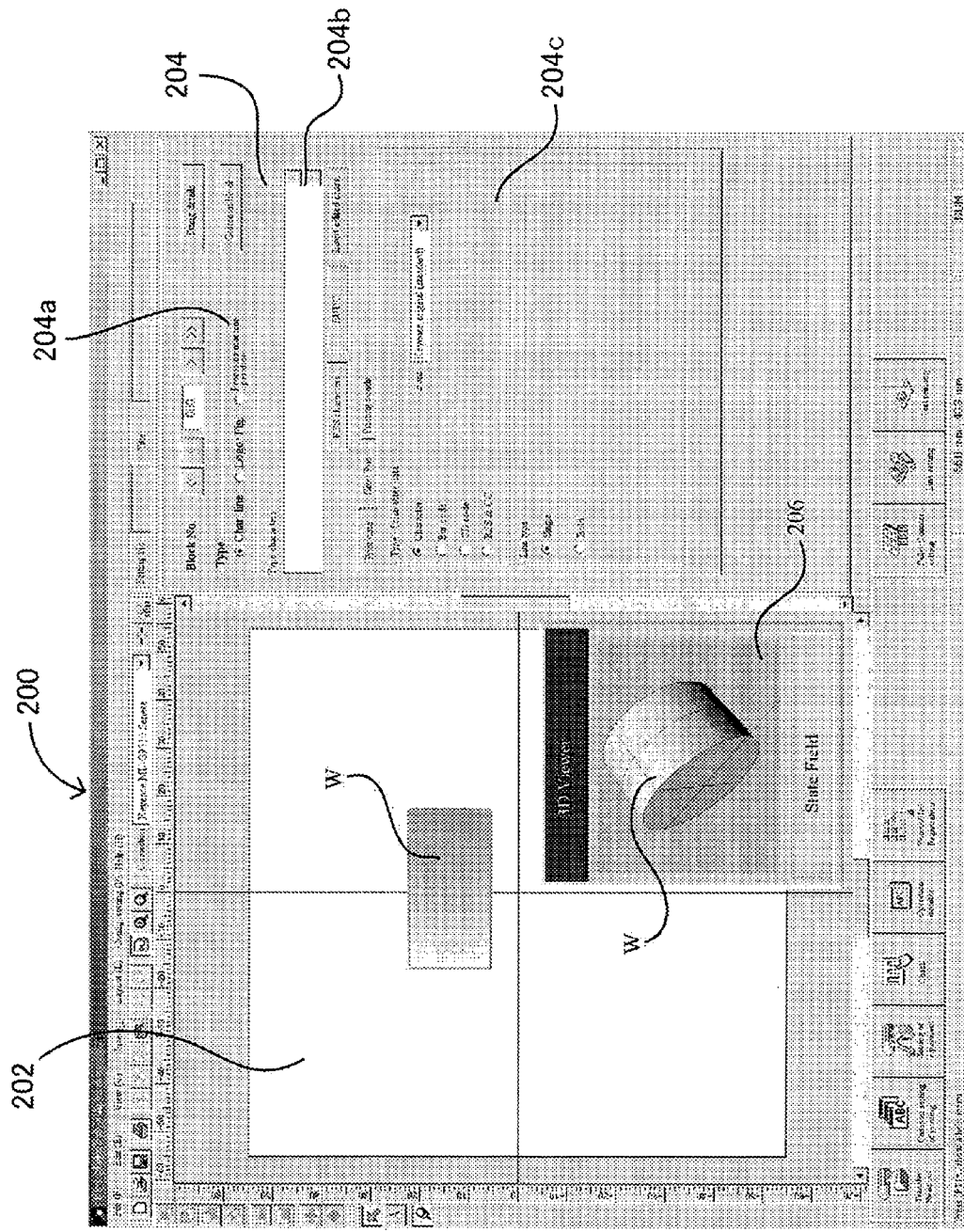
FIG. 23 is an illustration showing a user interface window of a three-dimensional processing data setting program.

As described above, when inputting information on the three-dimensional work to be printed through the input unit 3, a graphic image of the work appears in the window of the user interface of the processing data setting program 200 as shown in FIG. 23 by way of example. The window displays a preview area 202 where a current image of a print pattern is previewed and a dialog box 204 where a user inputs a print pattern which will be described later. In this example, a two-dimensional graphic image of a work W (a plane view of a cylindrical work lying at its side). The graphic image can be changed in size, position and location by the use of a mouse or by coordinate dimensions. The window further displays a viewer box 206 below the preview area 202 where a three dimensional graphic image of a work, i.e. a round work in this embodiment, is displayed in perspective figure. It is preferred that the graphic image in the viewer box 206 can be changed in position, angle and size and turned by positioning the mouse pointer on the graphic image and drag it. Layouts and locations of the respective areas may be changed in the window as desired. Further, the respective areas may be displayed in different windows.

Then, a user specifies a surface of the work on which the print pattern is printed. In this instance, it is allowed to specify a region of a work including a surface to be printed instead of specifying the entire shape of a work.

Figure 24:
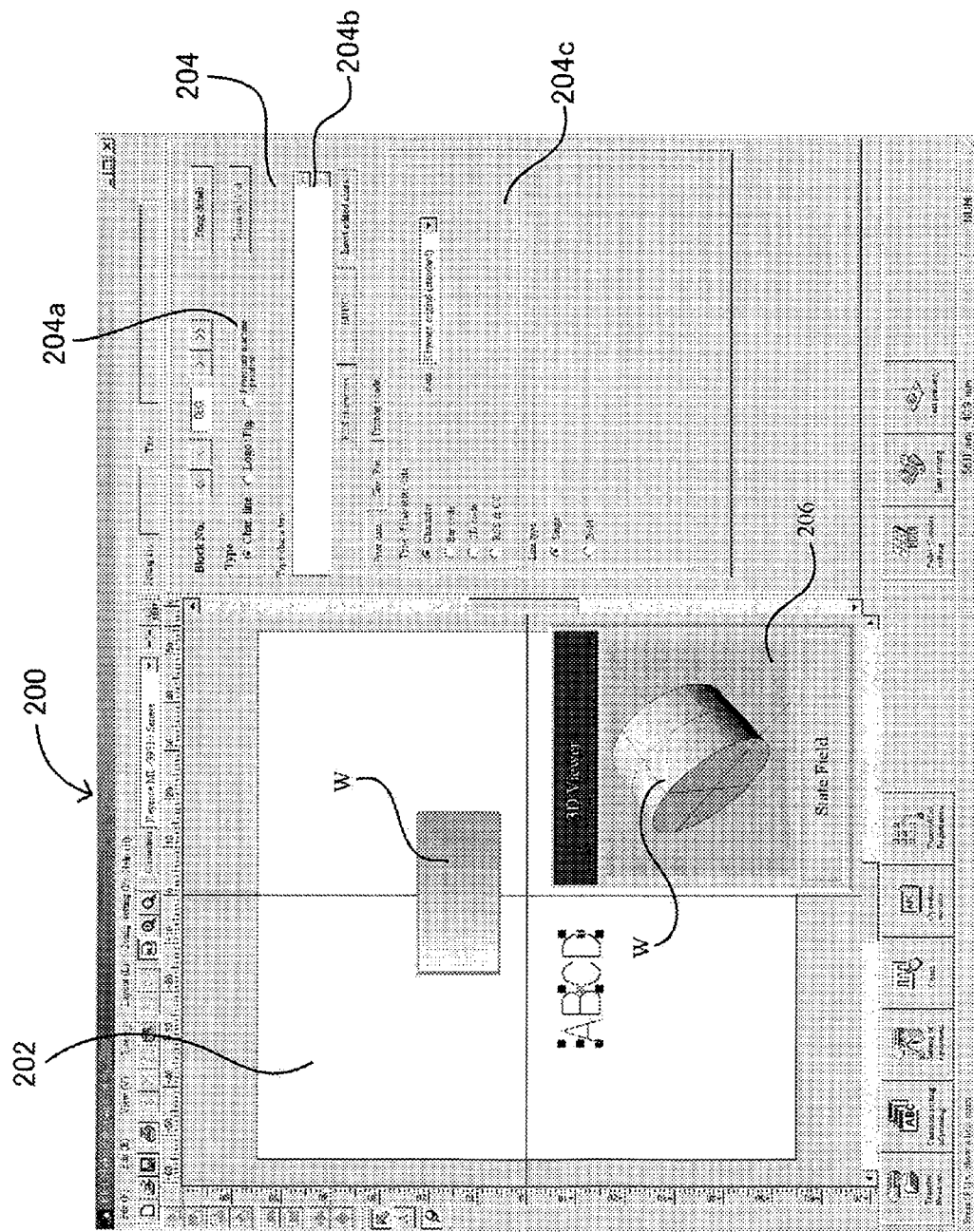
FIG. 24 is an illustration showing a user interface window of the three-dimensional processing data setting program for inputting information of a processing pattern.

After having input information on a three-dimensional work in step S11, the sequence logic proceeds to step S12 where information on a print pattern such as a character string and/or a graphic symbol are inputted through the print pattern input means 3B of the input unit 3. FIG. 24 illustrates a user interface of the processing data setting program 200 for generating a print pattern. In this interface, the print pattern input means 3B is realized by a print pattern input dialog box 204. The window displays a print pattern edit area 202 and a dialog box 204. The dialog box 204 contains three boxes, "Print Type" box 204*a* for selecting a print type among a character string or text, a logotype, a graphic symbol and a machine behavior, "Character Input" box 204*b* for character strung input and "Details" box 204*c* for specifying a font, a font size, a line style, line sickness, etc. When typing a character string or text "ABCD" as a print pattern in the "Character Input" box 204*b* after selecting a character string in the "Print Type" box 204*a*, a print pattern comprising the character string "ABCD" is displayed as a planer image in the print pattern edit area 202.

Figure 25:
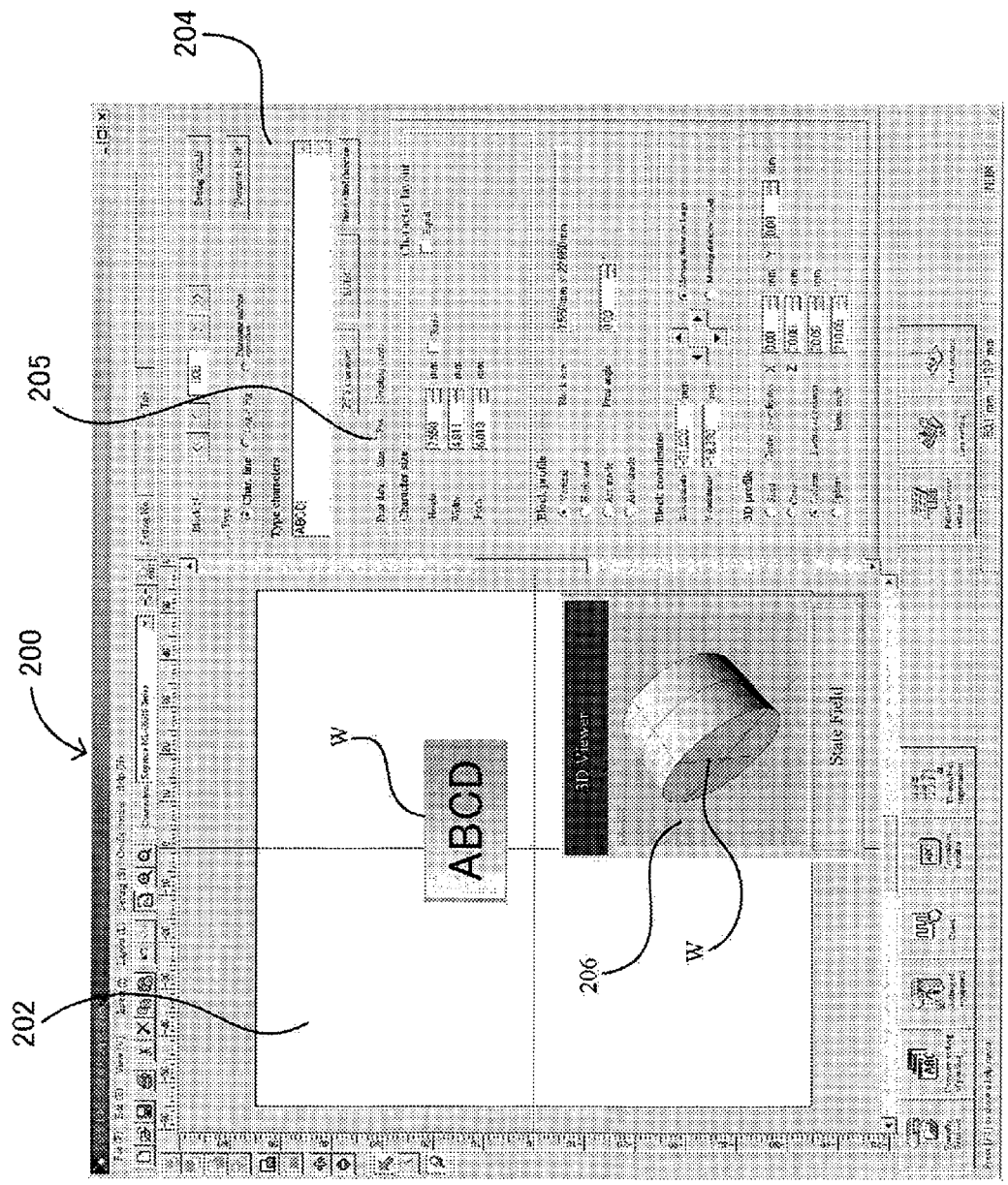
FIG. 25 is an illustration showing a user interface window of the three-dimensional processing data setting program for inputting a character string as a processing pattern.
Figure 26:
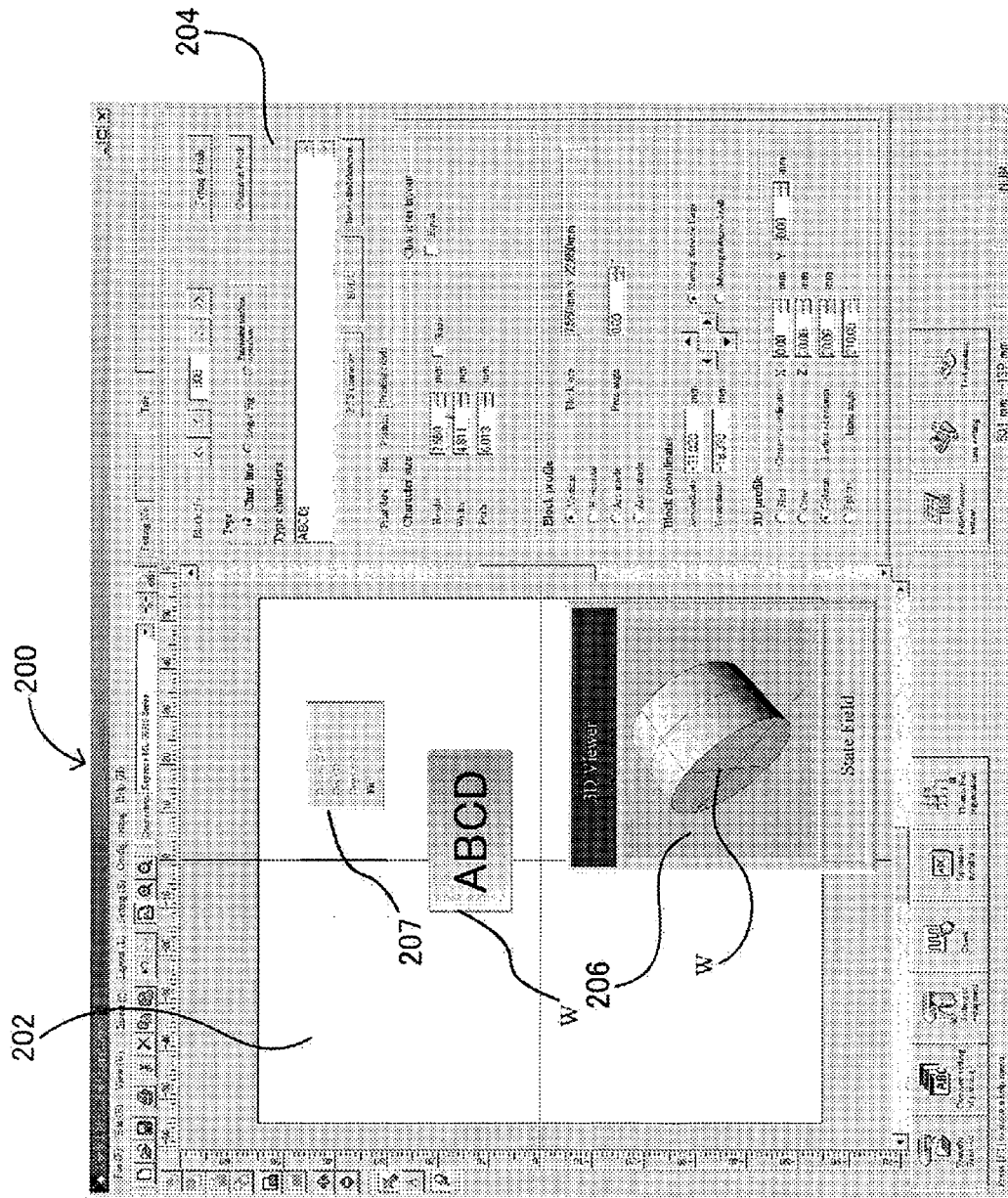
FIG. 26 is an illustration showing a user interface window of the three-dimensional processing data setting program for pasting a character string to a work surface.

Subsequently, information on the print pattern is converted into three-dimensional space coordinate data in step S13. Specifically, as shown in FIG. 25, the character string "ABCD" can be changed to a desired size, by positioning the mouse pointer on a frame handle and drag the handle until the text box is the desired size. The character string is subsequently superposed on an object, i.e. an image of a three-dimensional work surface W. For superposition of the character string "ABCD" on the object, the character string "ABCD" is clicked on and held with the right mouse button and then dragged to and dropped on the object. Otherwise, the character string can be precisely superposed on the object by specifying a position of the character string in X and Y coordinate values. Specifically, as shown in FIG. 25, a size/position tab 205 of the "Details" box 204c is clicked to specify a print position of the character string by typing X and Y coordinate values. As necessary, the character string may be adjusted in character size on the interface. The character string is superposed on the object by selecting "Fitting" on a menu 207 appeared by clicking the right mouse button. That is, three-dimensional space coordinate data of a print pattern is generated by carrying out coordinate conversion of two-dimensional coordinates to three-dimensional space coordinates so as to match virtually a two-dimensional print pattern to the three-dimensional work W. This coordinate conversion is performed by the coordinate conversion means 80A of the arithmetical and logic unit 80. As a result, while the character string made in three dimensions is displayed in a viewer box 206, the character string superposed on the work surface is somewhat distorted at opposite ends due to data conversion of the two-dimensional work surface into a three-dimensional work surface.

Figure 27:
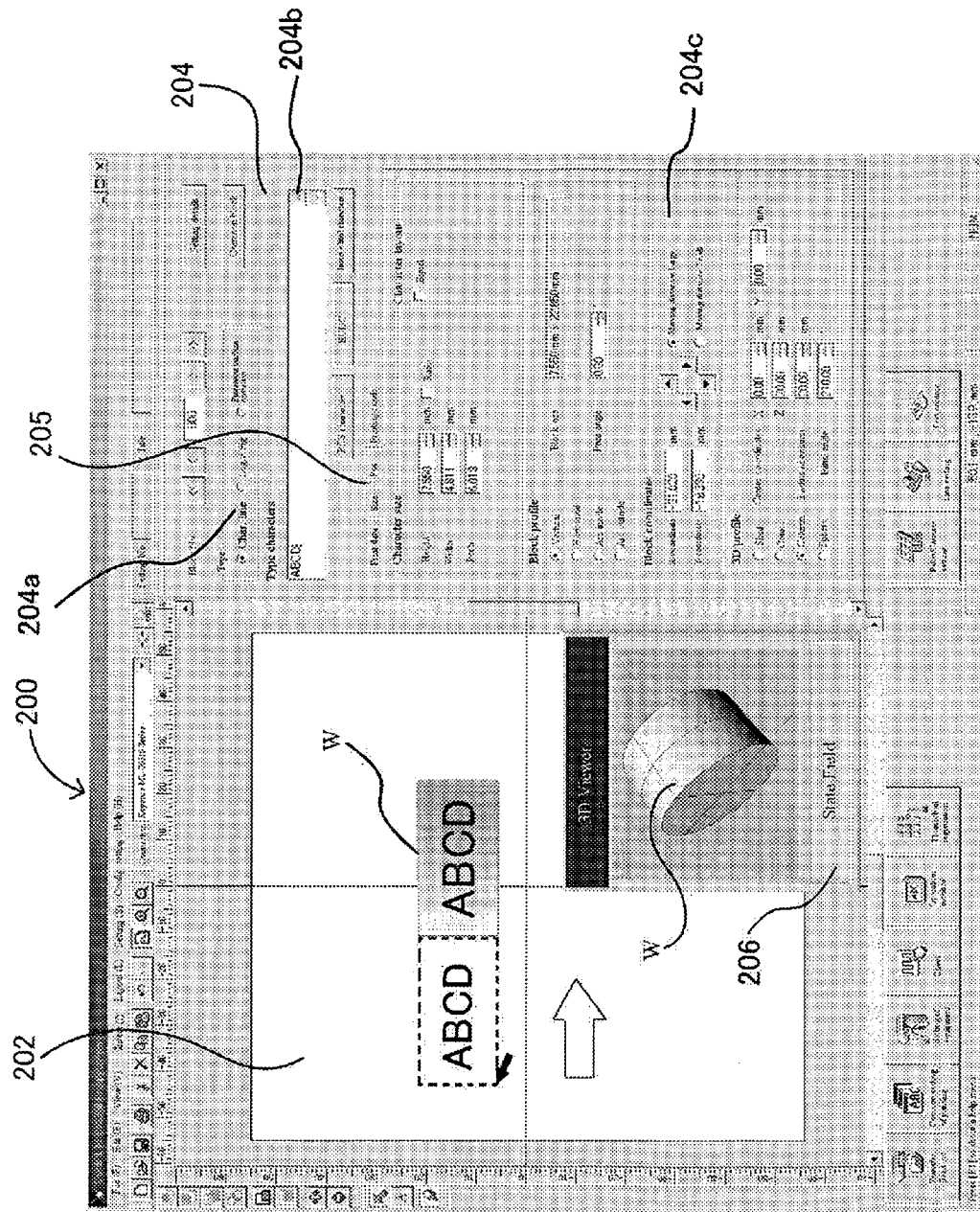
FIG. 27 is an illustration showing a user interface window of the three-dimensional processing data setting program for explaining deformation of a character string.
Figure 28:
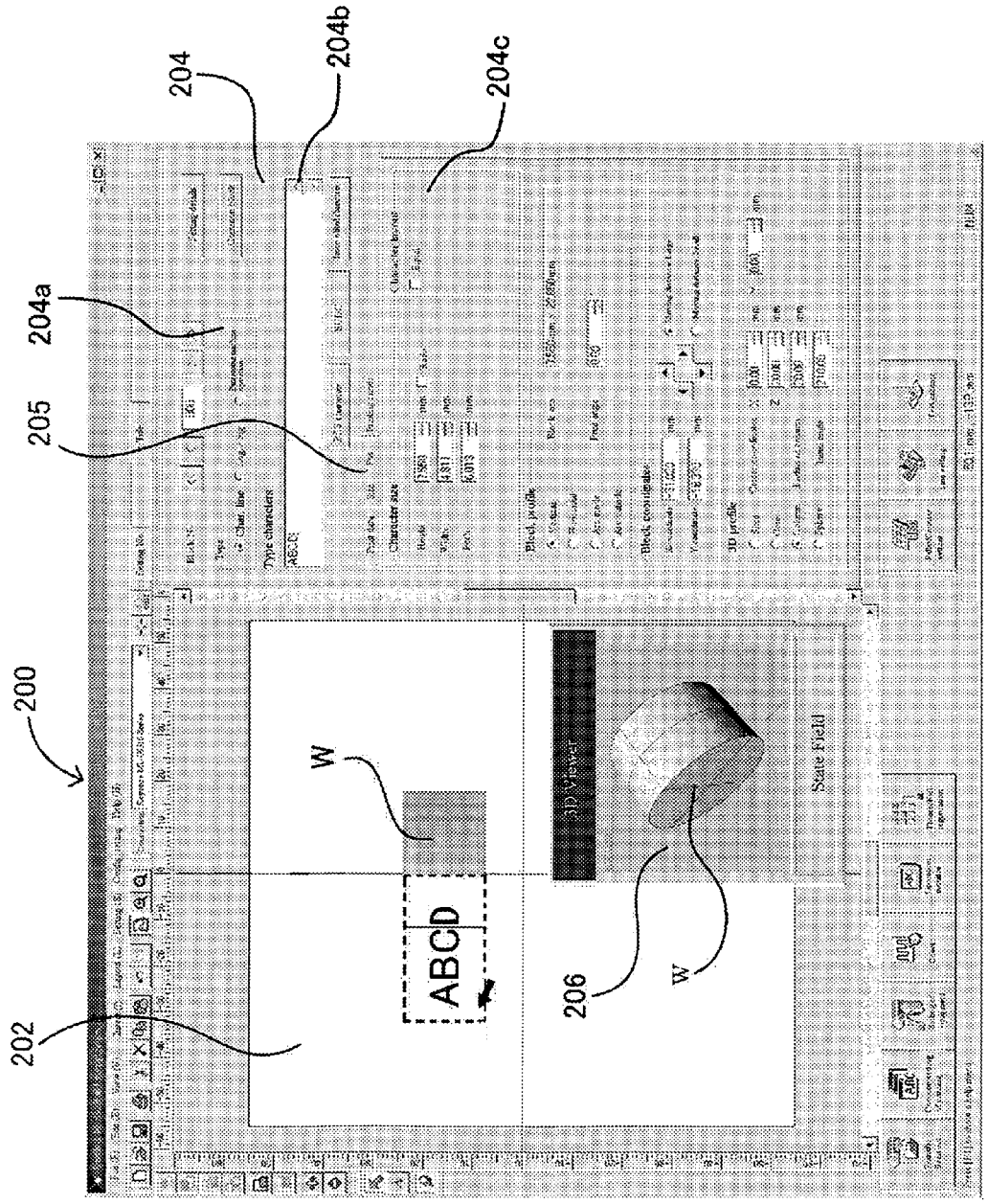
FIG. 28 is an illustration showing a user interface window of the three-dimensional processing data setting program for explaining distortion of a character string.

In addition to deformation of the print pattern to a three-dimensional print pattern by pasting, the print pattern can be deformed or warped according to a profile of the work surface and, at the same time, how the deformation goes underway is displayed in real time as shown in FIGS. 27 and 28.

Referring to FIG. 27 showing how the character string is superposed on or pasted to the work surface, the character string "ABCD" is clicked on and held with the right mouse button and then dragged to and dropped on the work surface W (a side surface of the cylindrical work W laying at a side). Then, as shown in FIG. 28, when the character string "ABCD" is superposed on the work surface W, the character string "ABCD" deforms in real time as it is pasted close to the work surface. It is possible to display a progress of deformation of the character string "ABCD" on an image of the work W displayed obliquely in real time. According to the process, since a user confirms a deformed character string in real time, it is made more easier to lay down the character string in an intended position. Because such the coordinate operation generally requires a massive amount of calculations, if using a computer having low throughput capacity, it is possible to deform the text box only according to the work surface and to leave out display of deformation of the character string itself.

It is possible to leave the fitting procedure undone. In this case, the X and Y coordinates values of the print pattern are maintained and a print pattern is adjusted in position in a Z direction. As a result, the print pattern on a work surface is distorted. However, the print pattern can be readable rightly. Taking a bar code printed properly on a curved work surface in strict accordance with the curve for instance, when the bar code is scanned by a light in a specific direction, printed black and white lines are possibly dimensionally distorted. In order to prevent an occurrence of dimensional distortion of the lines, a laser marking unit is controlled in the Z direction during printing a bar code so that the printed bar code is read rightly when read from a specific point.

After having acquired three dimensional space coordinate data of the print pattern in step S13, a layout adjustment and a fine position adjustment in the Z direction are executed as necessary in step S14. The fine position adjustment can be performed by the use of a mouse wheel. The processing data generated through the sequence is transferred to a controller of the marking unit 150 by clicking a "Transfer/Read Out" button in the interface of the processing data setting program 200. The laser marking unit 150 executes printing of the character string "ABCD" according to the processing data. Prior to actual printing, test printing may be carried out in order to check on printing quality of the printed pattern. The processing data may be reset according to the result of test printing. The processing data setting sequence may be repeated to generate processing data of a plurality of different print patterns to be printed on the same work surface profile. It is possible to display a plurality of images of different works and to generate data of a processing pattern in the window.

The following description is directed to various algorithmic techniques for generating three-dimensional processing data which include a method for generating three-dimensional location data of each characters forming a character string to be printed on a three-dimensional work surface, a method for developing a three-dimensional work in plan, and a method in which a texture mapping technique is used.

Figure 29:
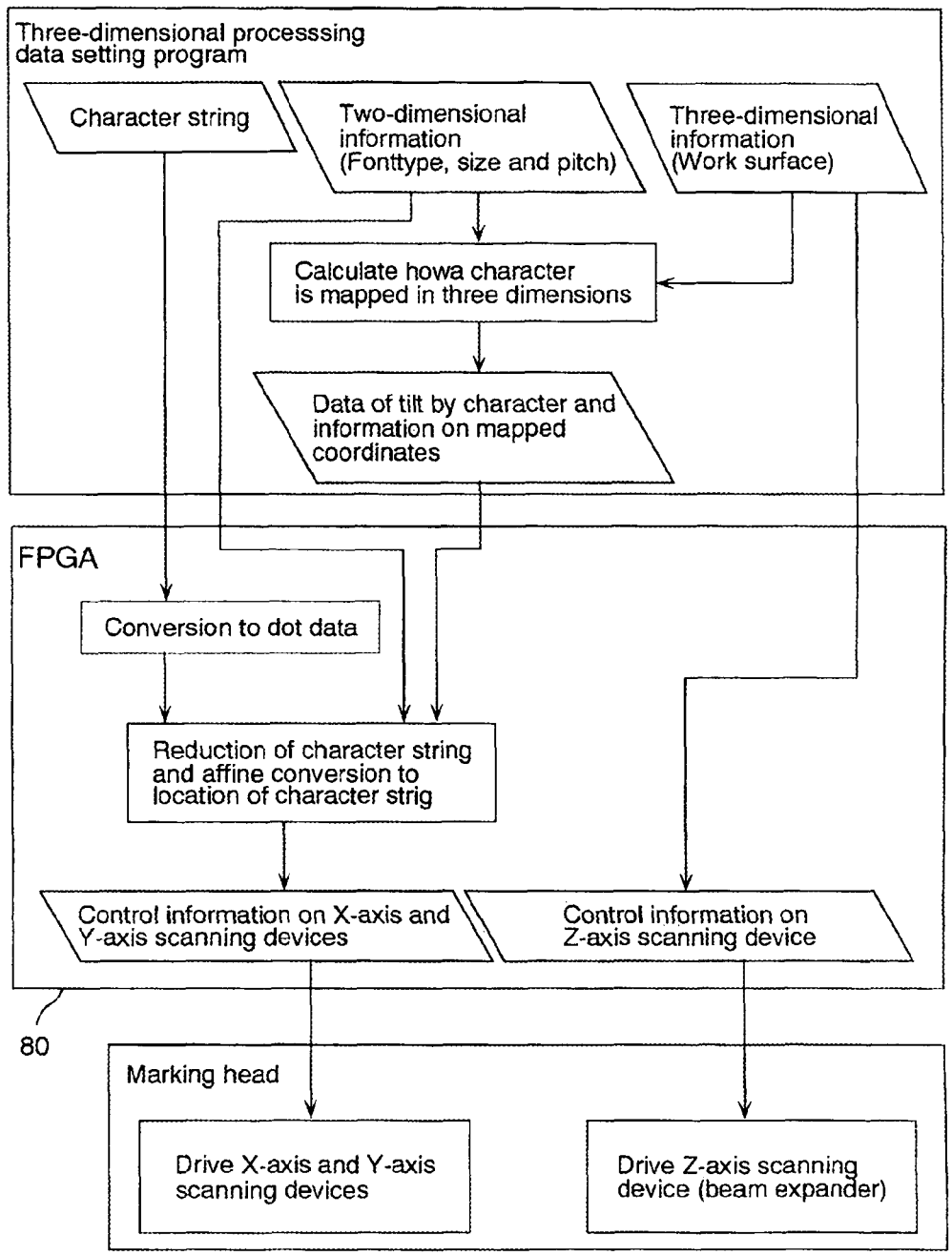
FIG. 29 is an illustration showing a sequence of generating three-dimensional processing data of individual characters of a character string as a processing pattern.
Figure 30:
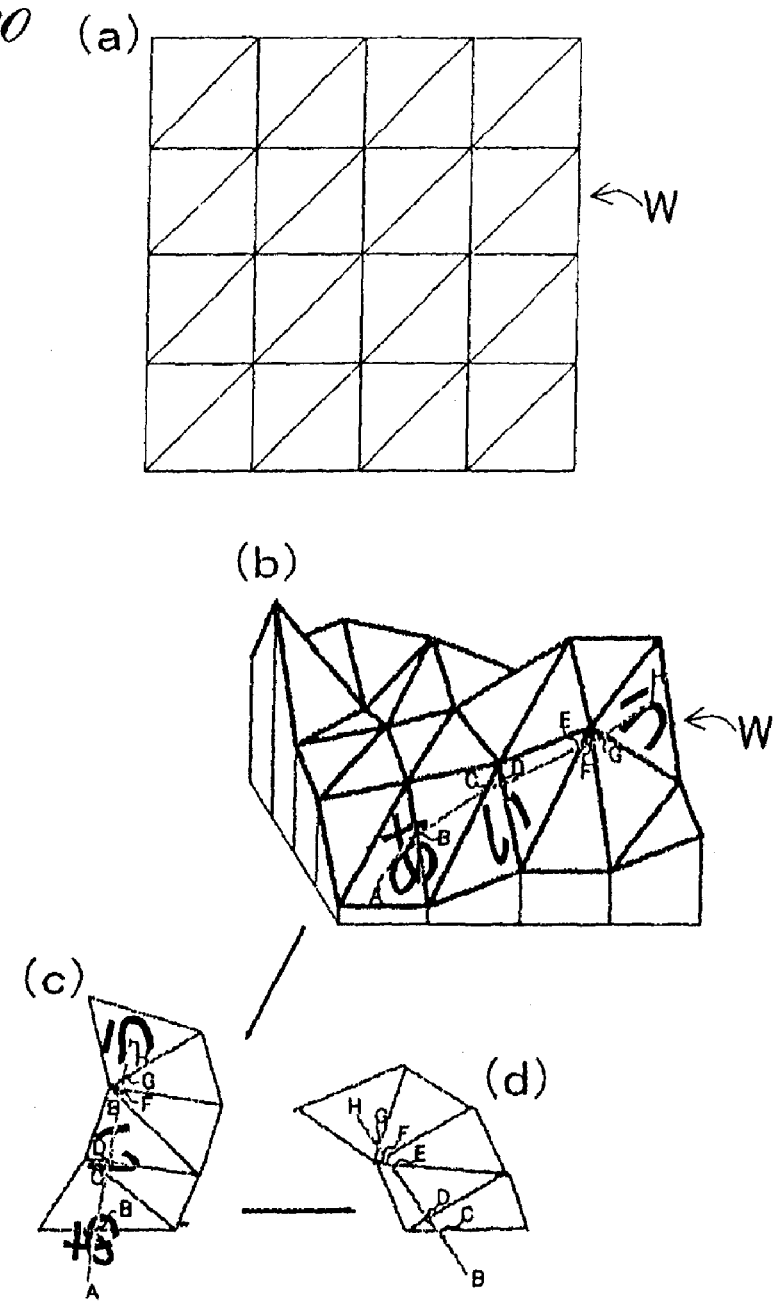
FIG. 30 is an illustration showing printing a character string on a three-dimensional work.

FIG. 29 is an illustration showing the method for generating three-dimensional location data by character form a three-dimensional work specified by a user and information of a two-dimensional print pattern to be printed on the work surface by the use of the processing data setting program. As shown in FIG. 29, operation for generating three-dimensional data is divided into three processes, namely a process by the use of an application software, i.e. a three-dimensional processing data setting program, a process by the use of a hardware such as FPGA forming an arithmetical and logic unit 80 in this embodiment, and a process at the laser marking machine 100.

The three-dimensional processing data setting program manages the content of a print pattern comprising a character string and carries out an operation how individual characters of the character string are mapped in three dimensions on the basis of two-dimensional information on character attributes including a font size, a character separation, a character form and the like and three-dimensional information representing a profile of work surface, and besides calculating tilts of the individual character in the direction of height and coordinates of the characters after mapping.

The arithmetical and logic unit 80 converts the content of the specified character string to dot data and calculates mapping positions of the character string in a plane by converting a character string reduced in any desired directions to data of character locations on the basis of the dot data, the two-dimensional, the coordinates and tilts of the individual characters through affine transformation. Further, arithmetical and logic unit 80 generates information on control of the X-axis and the Y-axis scan device on the basis of the mapping position data and information on control of the Z-axis scan device on the basis of the data of the three-dimensional information. The laser marking machine 100 controls the X-axis, the Y-axis and the Z-axis scan device to print the character string.

The mapping algorithm for pasting a character string to a three-dimensional work surface is described in detail below. First of all, consider references for a layout of character string when extending the layout of a character string specified in two dimensions such as vertical writing, horizontal writing or circular-arc writing to a layout in three dimensions. In this instance, characters are arranged based on a reference point and a reference line along which the characters are positioned. For example, the reference is a straight line for horizontal writing and a circular-arc for circular-arc writing. Locations of the individual characters are always defined by the reference line and specified distances from the reference point along the reference line, respectively. On the other hand, when considering a three-dimensional reference line, the reference line is defined as the shortest path on a surface of a Z-axis coordinate map containing information on height. This reference line is identical with a reference line in a two-dimensional plane into which the Z-axis coordinate map is expanded. Locations of the individual characters are determined based on a reference line found as the shortest path on a Z-axis coordinate map.

A reference is made to FIGS. 30(a), 30(b), 30(c) and 30(d) in order to consider a sequence of generating three-dimensional print data for printing a text comprising a character string "あいう" on a three-dimensional work surface. The work W has a three-dimensional surface shape approximated by a combination of a number of triangles as shown in plan view in FIG. 29(a) and in perspective view in FIG. 29(b). Discuss generation of three-dimensional processing data necessary for printing a text comprising a character string "あいう" on the three-dimensional work surface on the basis of a reference line ABCDEFGH which comprises straight line segments AB, BC, CD, DE, EF, FG and GH. Triangles involving the reference line ABCDEFGH can be depicted in two dimensions as illustrated in FIG. 29(c). Therefore, the character string "あいう" is printed along the reference line ABCDEFGH on the work surface as illustrated in FIG. 29(c). In this instance, the line segment AB extends in a direction specified by a user from a reference point, namely from a starting point A toward a point B in this embodiment. Since it is conceivable that an angle at which the line segment AB intersects with a side of a triangle is regarded as an incident angle at which the line segment BC intersects with a side of the adjacent triangle as shown in FIG. 30(d), the length of line segment BC is found by detecting an intersecting point of the line segment with the side of triangle. Accordingly, the length of reference line ABCDEFGH is dealt with by repeating the same operation regarding each of the triangles in two dimensions. Further, the individual triangles by which the work surface W is approximated are dealt with in the form of two-dimensional data on the basis of lengths of their sides in three dimensions. Although it is necessary to convert the reference point A from three-dimensional to two-dimensional, all the remaining intersecting points can be calculated in two dimensions. The length of reference line ABCDEFGH is determined by accumulation of lengths of the individual line segments. Here, letting k (an integer≧0) and n be an ordinal number of a character and a character pitch specified by the user, respectively, the reference line is located so that the individual constituent characters are centered at distances of kn from the reference point A, respectively. In this way, the reference line is arranged in three dimensions, the characters are arranged on the basis of three-dimensional data of the reference line. The character string may be laid on, above or below the reference line.

As three-dimensional arrangement of the reference line is attained in this way, three-dimensional data of the reference line is obtained on the basis of the three-dimensional arrangement of the reference line. Characters forming the character strung are put in position on so that a center line of the character string is in alignment with the reference line. It is of course allowed to put the character string above or below the reference line at above or below.

If taking an obliquity of a triangle in Z-axis is taken as an obliquity of a character printed on the triangle, these obliquities are not always consistent with each other when macroscopically observed. Therefore, it is preferable to take an arithmetical mean of obliquities of triangles comparable in width to a character as an obliquity of the character. According to this manner, while, since an obliquity of a work surface is calculated by character, the character string is not always pasted completely close to the work surface, printing of the character string is of practical use despite of approximate arithmetical operation, and besides comparatively easy and fast operation is performed. In the case of circular-arc writing, the same process as the horizontal writing is taken by dealing with a reference line on the basis of radiuses of circular arcs.

Figure 31:
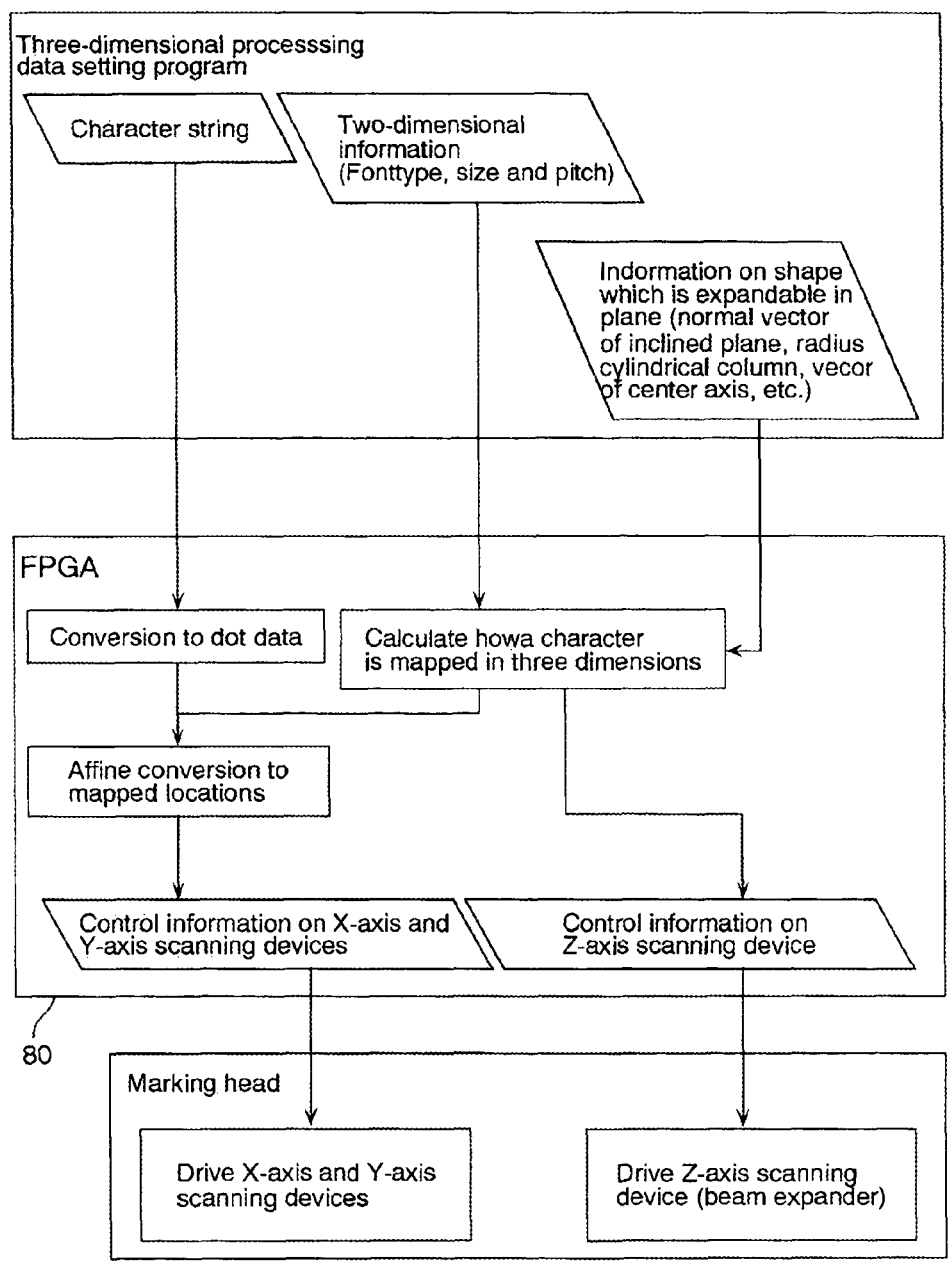
FIG. 31 is an illustration showing a sequence of generating three-dimensional processing data from a solid shape of a work expandable in plan and two-dimensional data of a processed pattern to be applied to the work.

FIG. 31 is an illustration showing the method for determining mapping positions on the basis of two-dimensional data of a printing pattern to be printed on a tree-dimensional work surface, which is expandable in plan, by the use of hardware. This method is capable of pasting a print pattern exactly close to a three-dimensional work surface and, however, available for tree-dimensional work surfaces only. As shown in FIG. 31, operation for generating three-dimensional data is divided into three processes including a process by the use of three-dimensional processing data setting program, a process by the use of FPGA forming an arithmetical and logic unit 80, and a process at the laser marking machine 100. The three-dimensional processing data setting program manages a print pattern comprising a character string, two-dimensional information on attributes of the print pattern such as a font type, a font size, a character pitch, etc., and besides information on attributes associated with a work shape such as an oblique plane, a cylindrical column, a circular cone, etc. which are developable in plan. The attributes include a normal vector of the oblique plane, a radius of the cylindrical column, a vector of a center axis, positions on a space coordinate system, etc.

The arithmetical and logic unit 80 performs an operation regarding how the character forming a part of the character string is mapped in three-dimensions on the basis of the two- and three-dimensional information. Then control data for the Z-axis scanning device is generated from the operation result. At the same time, the specified character string is converted to dot data. Mapping locations of the characters in two-dimensions are calculated after affine transformation of the mapped characters to locations n the basis of the dot data and the mapping result and, further, control data for the X-axis and Y-axis scanning devices is generated from the converted location data. The laser marking machine 100 drives the X-axis, Y-axis and Z-axis scanning devices to print the character string.

According to this method, how the two-dimensional data of the individual characters are mapped is arithmetically easily calculated on the basis of the two-dimensional data of the character string and the three-dimensional work surface developable in plane. It is possible to generate three-dimensional processing data by the use of texture mapping. The texture mapping is known in various types of techniques for generating 3D computer graphics and may take any type well known in the art. This method pastes a two-dimensional print pattern to a two-dimensional work surface virtually represented by repeatedly executing an operation for basically determining how dots of the print pattern are plotted on the three-dimensional work surface.

Conventional laser marking or printing machines are adapted to drive galvanometer scanners according to dot data to which information on lines, circular-arcs, etc. of a print pattern is converted by the arithmetical and logic unit 80 such as FPGA immediately before an execution of printing. This is because, since data processing is too late when executing coordinate conversion of information on lines, circular-arcs, etc. by the use of software and the amount of dot data is too large, the data processing is executed in time so as to be in time in conformity with a data transfer rate by executing the dot data conversion immediately before drive control of the galvanometer scanners. On the other hand, the technique using the texture mapping is a technique for calculating how two-dimensional coordinates of a dot is converted to three-dimensional coordinates. In light of this, in the case where implementing the technique for generating three-dimensional processing data by texture mapping in such a conventional laser marking or printing machine, the conversion to coordinate data of a print pattern is performed by sequentially executing texture mapping from two-dimensional data of lines and circular-arcs and three-dimensional data of a work surface which are source data for the data conversion Although, in the three-dimensional processing data setting method according to the above embodiment, the three-dimensional printing data is acquired by specifying a three-dimensional work surface and then executing coordinate conversion of a print pattern so that the print pattern matches closely to the three-dimensional work surface, nevertheless, the printing pattern may be directly specified in three dimensions without using a three-dimensional work surface as a reference surface.

Figure 32:
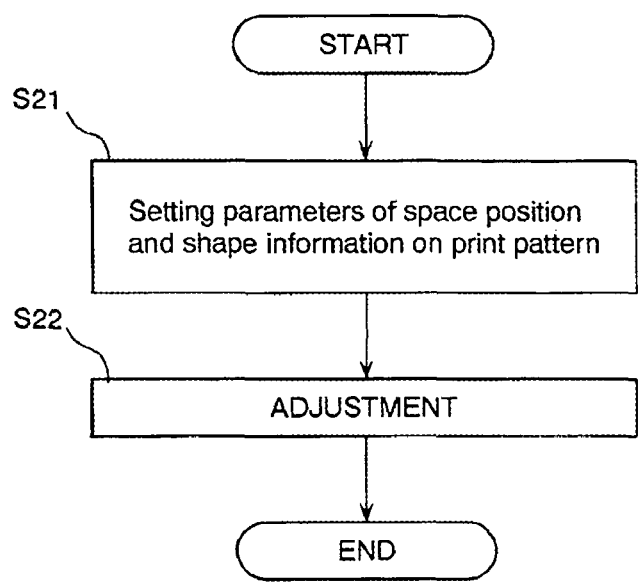
FIG. 32 is an illustration showing a sequence of setting three-dimensional processing data according to another embodiment of the present invention.

FIG. 32 is a flowchart illustrating a sequence of three dimensional processing data setting method according to another embodiment of the present invention. As shown, when the sequence logic proceeds to step S21 to set parameters for space positions and shape which are defined so that a print pattern matches a three-dimensional work surface. Setting of the parameters may be performed by any one of the following manners.

Figure 33:
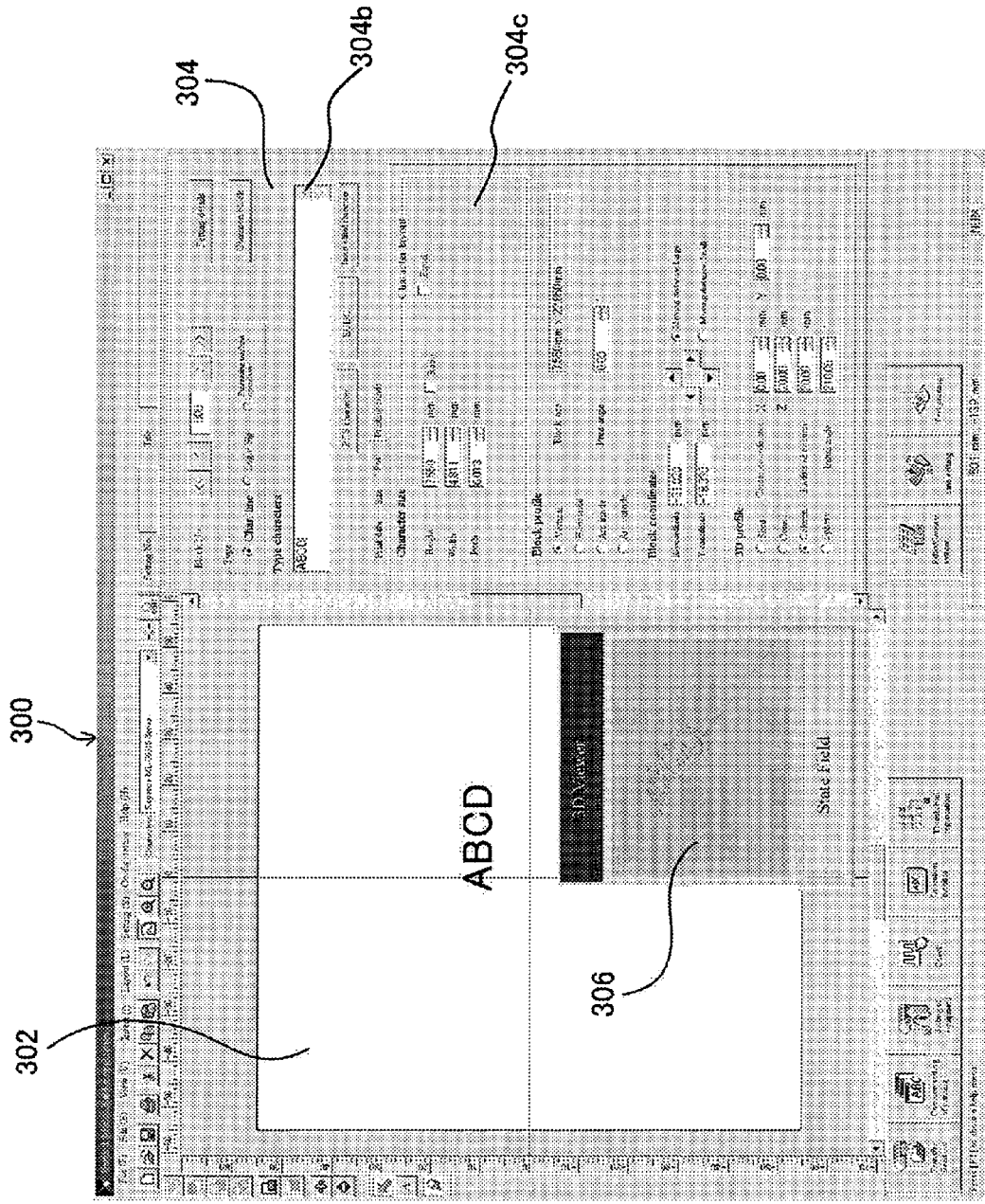
FIG. 33 is an illustration showing a user interface window of a three-dimensional processing pattern setting program used for drawing a printing pattern in three dimensions.

(1) Setting data of a three-dimensional processing pattern using a computer program
(2) Setting data of a three-dimensional processing pattern through data communication with an external equipment
(3) Importing data of a three-dimensional processing pattern from a data file FIG. 33 shows a user interface 210 of a three-dimensional processing pattern setting program 300 used in the method (1) for drawing a printing pattern in three-dimensions. Similar to the interface shown in FIG. 19, a three-dimensional processing pattern is generated by a similar feeling of computer-assisted design by the use of an existing 3D-CAD system and three-dimensional modeling tools necessary for solid modeling. The interface shown in FIG. 33 includes a data entry box and drawing tools similar to those of the interface of the three-dimensional work surface setting program 210 shown in FIG. 19. In other words, the program shown in FIGS. 25 and 33 have both functions of the three-dimensional work pattern setting program 210 and the three-dimensional processing pattern setting programs 300. It is of course allowed to use separate programs for three-dimensional work pattern setting and three-dimensional printing pattern setting, respectively.

Referring to FIG. 33, a user is prompted to type characters or a character string forming a printing pattern in "Characters/Text" box 304b in a dialog box 304. When typing a character string "ABCD" in the "Characters/Text" box 304b, the character string "ABCD" appears in plane in edit area 302. Then the user is prompted to input geometric parameters required to specify a spatial arrangement of the character string and a layout of characters in "Details" box 304c. The geometric parameters include character information such as a character height, a width of character, a character spacing, etc.; string information such as vertical writing, horizontal writing, circular-arc writing, an oblique angle, etc.; and print information such as coordinates of a print starting position and a center position, a center, a radius and length of arc, etc. The parameters may optionally include attributes available according to a profile of a work surface. The geometric parameters are directly inputted in figures by keys and may be automatically changed by enlarging or reducing the character string "ABCD" in the edit area 302 as appropriate. In order to print the character string "ABCD" on a side surface of a cylindrical column, the character string "ABCD" is specified in a circular-arc in three dimensions. According to the geometric parameters, the character string "ABCD" is displayed in a circular-arc in three dimensions in a viewer box 306 as shown in FIG. 33. When specifying another value of a radius of circular-arc as a geometric parameter, the character string "ABCD" in the viewer box 306 is changed in curvature, maintaining its three-dimensional representation. Consequently, the user can visually ascertain an immediate character string "ABCD" in the window even during editing work. At the same time, since the character string "ABCD" displayed in two dimensions in the edit area 302 is somewhat distorted at opposite ends, the user can visually ascertain the character string "ABCD" as viewed in plane. Although, in the above embodiment, the case where a single character string is specified, two or more character strings, such as a two deck corporate logo, may be specified all together. Further, it may be possible to specify a character string by constitutive character or by constitutive line segment.

Figure 34:
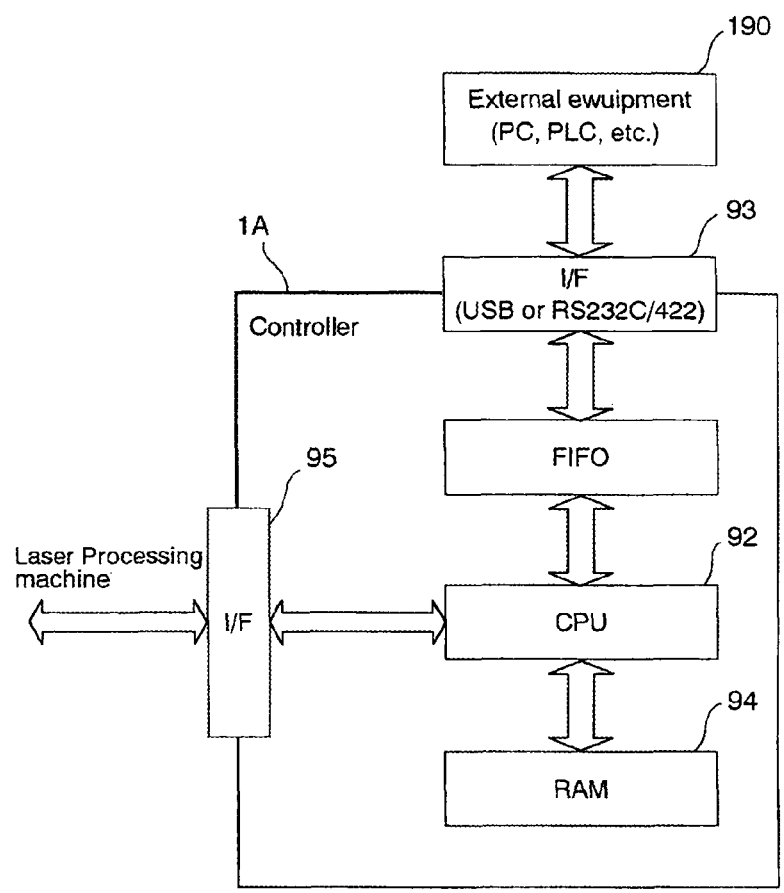
FIG. 34 is a block diagram illustrating a controller for data communication with an external equipment.

Referring to FIG. 34 schematically showing an organization of a controller 1A for implementing the method (2), parameters necessary for setting a printing data, i.e. data of a character string pattern in this embodiment, is inputted to the controller 1A from an external equipment 10 such as the programmable logic controller (PLC) or a sequencer and then transferred to the laser marking processing. As shown, the controller 1A includes CPU 92 which controls a communication port 93 through a FIFO buffer to talk to the external equipment 190, specifically programmable logic controller (PLC) 190a, and RAM 94 which stores the processing data generated from the parameters in its memory. The controller 1A forwards the processing data to the laser marking unit through a communication port 95. The data communication can be carried out by the use of an interface such as RS-232C, RS-422A or USB. With the method in which processing data is automatically imported from the external equipment 190, i.e. the burden of setting three-dimensional processing data is eased on the side of laser marking unit.

Figure 35:
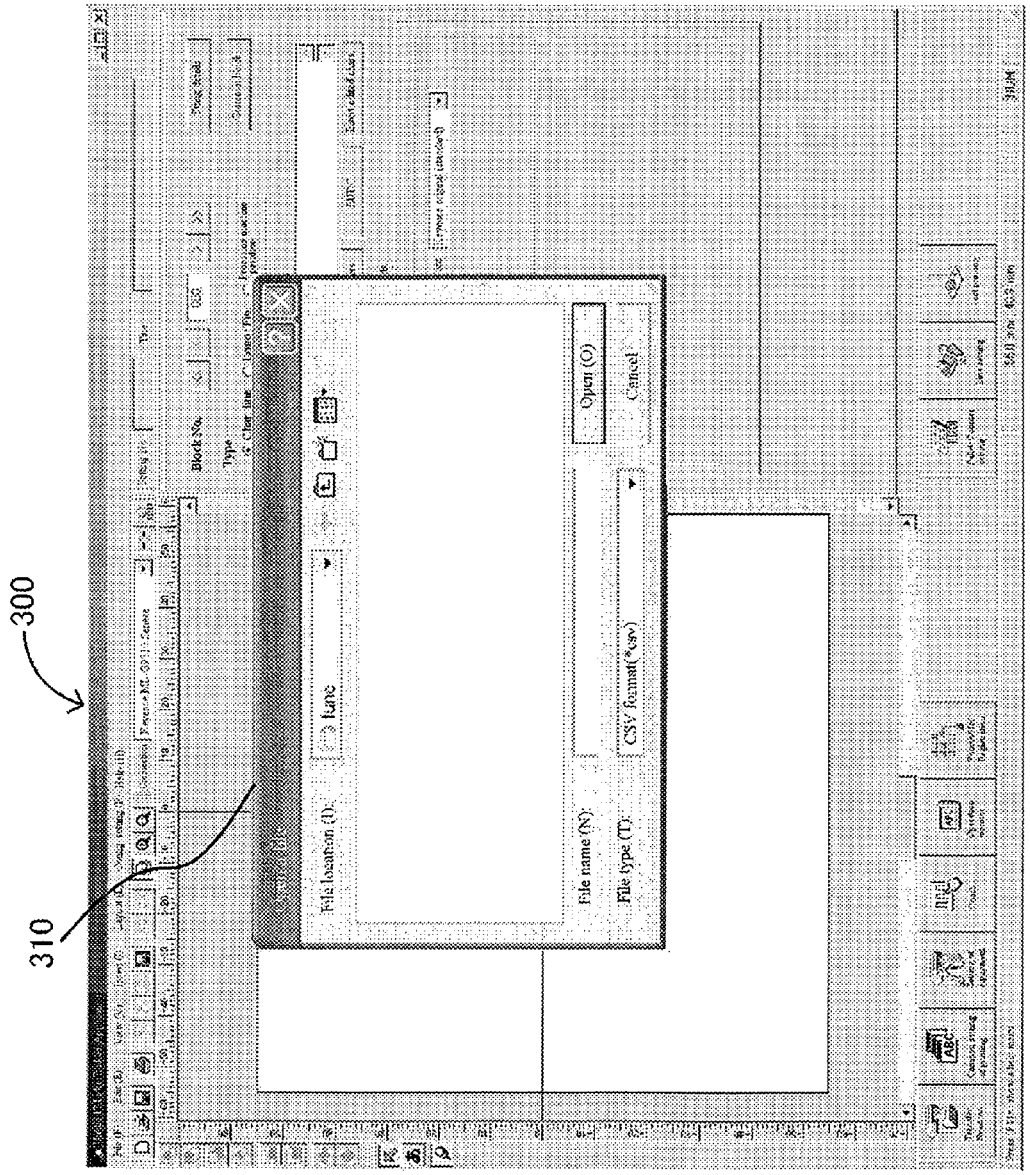
FIG. 35 is an illustration showing a user interface window of a three-dimensional processing data setting program for explaining import of a data file.

Referring to FIG. 35 showing an interface window for implementing the method (3) by a three-dimensional processing data setting program 300, the three-dimensional processing data setting program 300 prompts a user to activate a dialog box 310 for importing data necessary for setting a desired processing pattern by selecting a data file with information representing the processing pattern described thereon in the dialog box 310. When selecting the data file, the three-dimensional processing data setting program 300 imports the selected data file and automatically generates processing data from the information described on the selected data file. The data file can be described in various general-purpose data interchange formats such as CSV, XML and the like and may be described in any format well known in the art or a dedicated file format. The method in which processing data is automatically imported from a prepared data file eases the burden of setting three-dimensional processing data on the side of laser marking unit.

Subsequent to completion of setting of the processing data in step S21, a fine adjustment is executed to adjust the processing pattern, i.e. the character string, in layout, Z-axis position and the like in the interface window as necessary in step S22. The three-dimensional processing data setting program 300 prompts the user to forward the processing data set in this manner to the laser marking machine 100 for test printing for resetting checking on printing quality of the printed pattern prior to actual printing.

Before full-scale printing, preparatory adjustment is made to correct a printing position according to a variation of a work surface, a printing pattern according to a type of work. Such a preparatory adjustment is executed in terms of the following characteristics at the controller 1A shown in FIG. 36.

Figure 37:
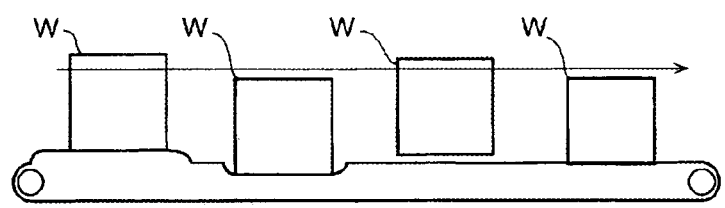
FIG. 37 is a schematic view showing differences in work surface level of works.

(1) Adjusting a printing position according to work height (2) Adjusting a printing position through image recognition (3) Changing a work shape by three-dimensional shape presetting As shown in FIG. 37, if works W fed by a conveyer are different in work surface level according to locations of the works placed on the conveyer, individual differences among works, moving behavior of the conveyer and the like, the work surfaces are different in distance with respect to the laser marking unit, prints on these works are possibly unclear and imprecise.

Figure 36:
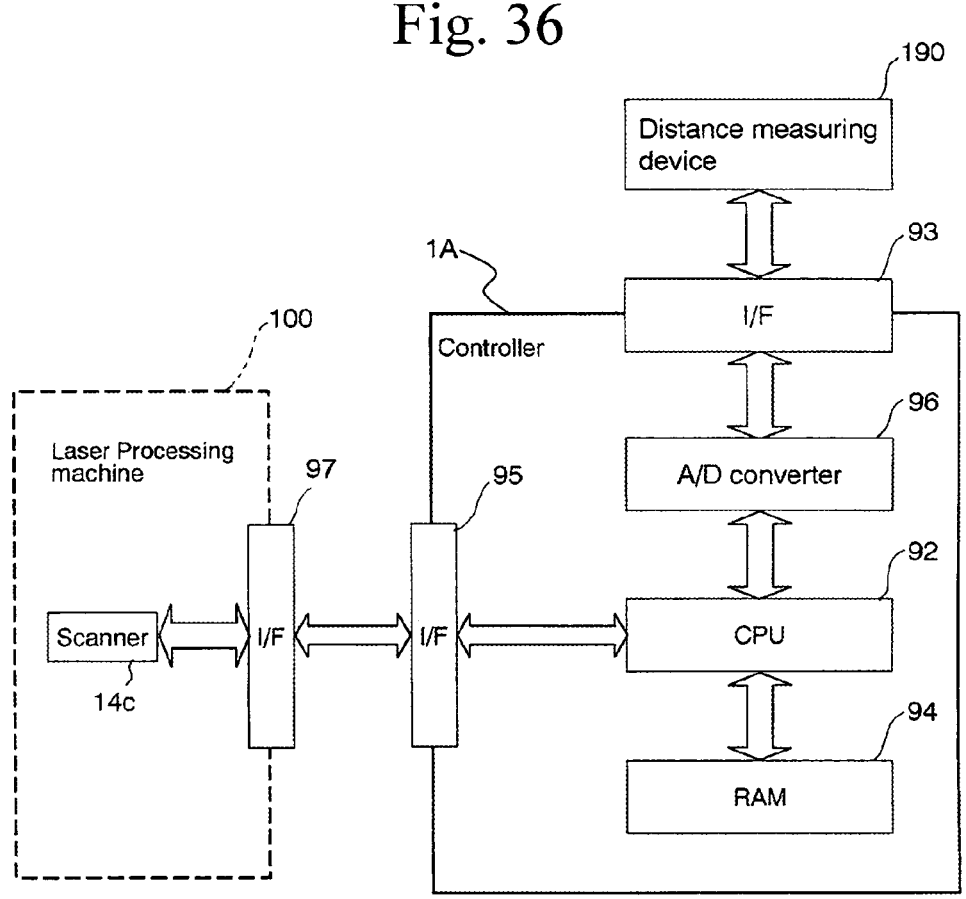
FIG. 36 is a block diagram illustrating a controller for adjustment.

Referring to FIG. 36, in order to deal with variations in work surface level, there is provided an external position detecting equipment 190 as an external device which comprises, for example, a displacement pickup 190b and/or an image recognition device 190c. Specifically, the position detecting equipment 190, more specifically the displacement pickup 190b, is adapted to detect a distance of a work surface in a vertical direction as information on Z-axis coordinate and sends a signal voltage representing the distance to the controller 1A through a communication port 93. The signal voltage is converted into a digital signal by an A/D converter 96. Then CPU 92 forwards the digital signal to the laser marking machine 100 through communication ports 95 and 97. The laser marking machine 100 controls the Z-axis scanning device 14c (see FIG. 1) according to the digital signal representing information on Z-axis coordinate, so as thereby to focus on a work surface of the work even though the work surface is displaced from a reference level. Although it is absolutely essential for the prior art laser marking machine to manually adjust a distance of the laser marking unit to a work surface according to a surface level displacement by work. Nevertheless, the laser marking machine 100 according to the above embodiment automatically carries out adjustment of the laser marking unit by detecting a surface level of a work by the displacement pickup 190b or on the basis of information prepared on individual works and, in consequence, performs high quality and precise printing easily.

Figure 38:
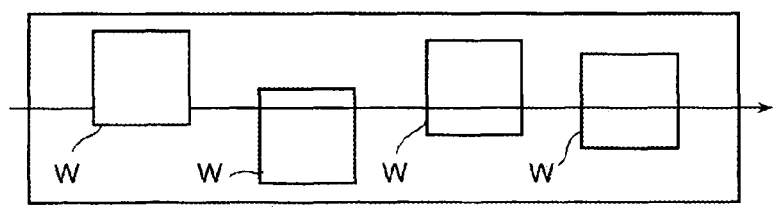
FIG. 38 is a schematic view showing differences in horizontal plane of works.

FIG. 38 shows works W which are displaced in transversal and/or lengthwise directions, i.e. X-axis and Y-axis directions, on a conveyer. The laser marking machine 100 is capable of performing high quality and precise printing easily irrespective of surface position displacements of works W by detecting a position of the working surface aimed by the laser marking unit by the position detecting equipment 190, specifically the image recognition device 190c, and finding a surface position displacement of the aimed position in X- and Y-axis directions from a printing position specified by three-dimensional processing data. Information on the surface position displacement is fed backed to the laser marking unit for readjustment of coordinates of printing position. In consequence, the laser marking machine 100 performs high quality and precise printing easily in X-axis and Y-axis directions as well as in Z-axis direction.

Figure 39:
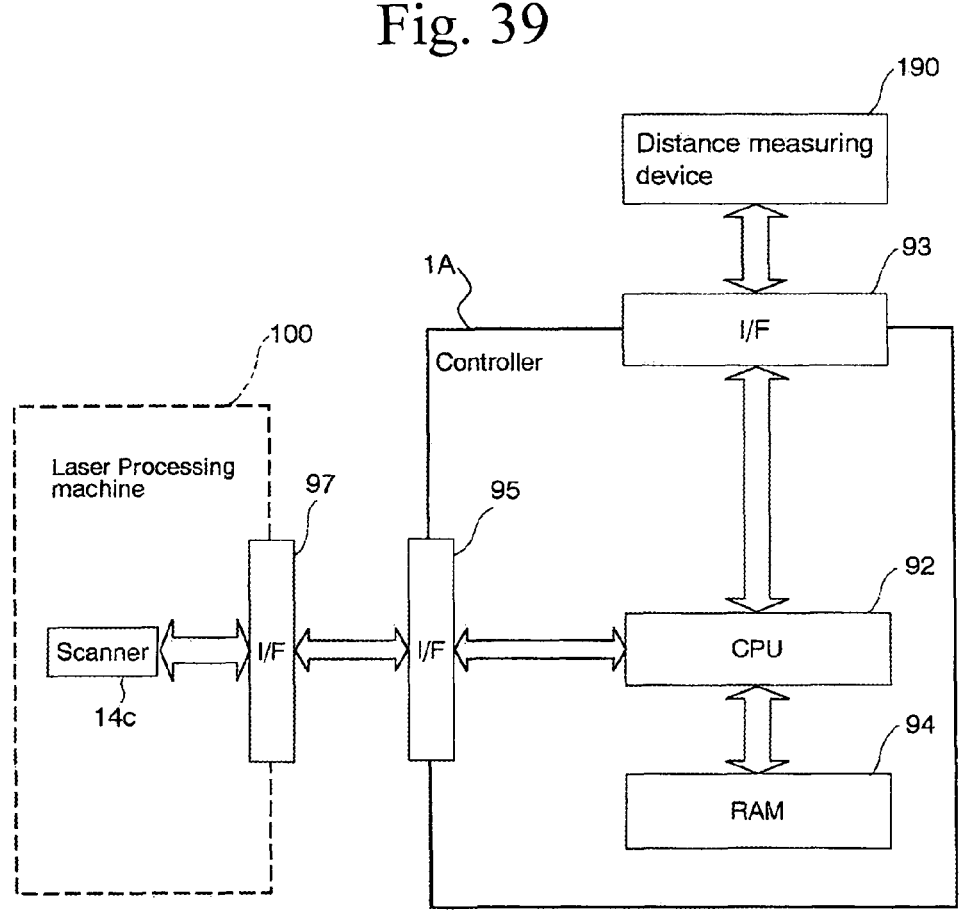
FIG. 39 is a block diagram illustrating a controller for switching setting of three-dimensional processing data.

FIG. 39 schematically shows a tree-dimensional processing data setting system according to an alternate embodiment. In the case where it is previously expected to implement processing on different types of works, three-dimensional processing data are previously prepared together with preset information for the expected individual types of works, respectively. A data switch command identifying the preset information is manually or automatically entered through an external equipment 190 to replace three-dimensional processing data having the preset information according to work types. The work types may be identified by a sensor device such as an image recognition device. For example, even when the conveyer feeds mixed works, such as beverage plastic bottles and beverage cans, in a processing line, the laser processing machine 100 performs high quality and precise printing on both subject works according to the work types, respectively, by detecting the work types by the sensor.

Although, as shown in FIGS. 34, 36 and 39 schematically showing the three-dimensional laser marking system according to the embodiments of the present invention, the controller 1A is connected to the laser marking machine and the external equipment through communication ports, respectively, nevertheless, it goes without saying that they may be electrically connected to each other through I/O ports for exchange of electrical signals.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A three-dimensional processing data setting system for setting three-dimensional processing data for driving a laser marking device to process a three-dimensional work surface in a specified processing pattern with a laser beam focused in a specified direction on the three-dimensional work surface, said three-dimensional processing data setting system comprising:

pattern information input means for inputting pattern information representing a processing pattern in which a three-dimensional work surface is processed and a two-dimensional position for display of said processing pattern;

two-dimensional display means for displaying thereon said processing pattern in two-dimensions at said two-dimensional position based on said pattern information;

position adjusting means for adjusting said processing pattern in a desired two-dimensional coordinate position on said two-dimensional display means;

profile information input means for inputting profile information representing at least a three-dimensional profile of the three-dimensional work surface for processing, said three-dimensional profile being selected from a plurality of predetermined different profiles of the three-dimensional work surface;

coordinate data conversion means for converting coordinate data of said processing pattern from two-dimensional plane coordinate data to three-dimensional space coordinate data so as to match said processing pattern represented by said pattern information with said three-dimensional work surface represented by said profile information in said two-dimensional coordinate position; and three-dimensional display means for displaying thereon in three dimensions said three-dimensional work surface represented by said profile information and said processing pattern represented by said three-dimensional space coordinate data.

2. The three-dimensional processing data setting system as defined in claim 1, further comprising height adjusting means for adjusting said processing pattern represented by said three-dimensional space coordinate data in said specified direction in which said laser beam is focused on said three-dimensional work surface.

3. The three-dimensional processing data setting system as defined in claim 1, further comprising layout adjusting means for adjusting said processing pattern represented by said three-dimensional space coordinate data.

4. The three-dimensional processing data setting system as defined in claim 1, wherein said pattern information input means is provided with size specifying means for specifying a size in which said processing pattern represented by said pattern information is displayed on said two-dimensional display means.

5. The three-dimensional processing data setting system as defined in claim 1, wherein said plurality of predetermined different profiles of work surface include at least a circular conical profile, a cylindrical columnar profile and a spherical profile.

6. The three-dimensional processing data setting system as defined in claim 5, wherein said profile information input means is provided with size specifying means for specifying a size of said three-dimensional profile to be selected.

7. A method for setting three-dimensional processing data for driving a laser marking device to process a three-dimensional work surface in a specified processing pattern with a laser beam focused in a specified direction on the three-dimensional work surface, said three-dimensional processing data setting method comprising the steps of;
   inputting pattern information representing a processing pattern in which a three-dimensional work surface is processed and displaying said processing pattern at a desired two-dimensional position according to said pattern information on a first display means;
   inputting profile information representing at least a three-dimensional profile of the three-dimensional work surface determined by selecting from a plurality of predetermined different profiles of the three-dimensional work surface and virtually displaying a work surface represented by said profile information;
   converting coordinate data of said processing pattern from two-dimensional plane coordinate data to three-dimensional space coordinate data so as to match a processing pattern represented by said pattern information with said work surface represented by said profile information in said two-dimensional coordinate position; and
   displaying said processing pattern described by said three-dimensional space coordinate data and said work surface represented by said profile information in three dimensions on a second display means.

8. The method for setting three-dimensional processing data as defined in claim 7, further comprising the step of adjusting said processing pattern represented by said three-dimensional space coordinate data in said specified direction in which said laser beam is focused on said three-dimensional work surface.

9. The method for setting three-dimensional processing data as defined in claim 7, further comprising the step of adjusting said processing pattern represented by said three-dimensional space coordinate data.

10. The method for setting three-dimensional processing data as defined in claim 7, wherein said step of inputting, pattern information includes a step of specifying a size in which said processing pattern represented by said pattern information is displayed on said first display means.

11. The method for setting three-dimensional processing data as defined in claim 7, wherein said plurality of predetermined different profiles of work surface include at least a circular conical profile, a cylindrical columnar profile and a spherical profile.

12. The method for setting three-dimensional processing data as defined in claim 11, wherein said step of inputting, profile information includes a step of specifying a size of said three-dimensional profile to be selected.

13. A method for setting three-dimensional processing data for driving a laser marking device to process a three-dimensional work surface in a specified processing pattern with a laser beam focused on the three-dimensional work surface, said three-dimensional processing data setting method comprising the steps of:
   setting parameters of pattern information representing a processing pattern in which a three-dimensional work surface is processed and a two-dimensional position at which said processing pattern is displayed on display means so as to match with the three-dimensional work surface to be processed; and
   adjusting, as appropriate, said processing pattern in a position on a two-dimensional coordinates displayed based on said parameters on said display means.

14. The method for setting three-dimensional processing data as defined in claim 13, wherein said step of setting parameters of pattern information comprises at least one selected from a method using a program which enables entry of a three-dimensional profile, a method of data communication with an external equipment or a method of importing a data file in which said parameters are recorded.

15. A computer-readable storage medium in which a computer program is stored for setting three-dimensional processing data for driving a laser marking device to process a three-dimensional work surface in a specified processing pattern with a laser beam focused in a specified direction on the three-dimensional work surface, said computer program comprising:
   a function of inputting pattern information representing a processing pattern in which a three-dimensional work surface is processed and a two-dimensional position for display of said processing pattern;
   a function of displaying said processing pattern in two-dimensions at said two-dimensional position based on said pattern information on a first display means;
   a function of adjusting said processing pattern in a desired two-dimensional coordinate position on said first display means;
   a function of inputting profile information representing at least a three-dimensional profile of the three-dimensional work surface for processing said three-dimensional profile being selected from a plurality of predetermined different profiles of the three-dimensional work surface;
   a function of converting coordinate data of said processing pattern from two-dimensional plane coordinate data to three-dimensional space coordinate data so as to match the processing pattern represented by said pattern information with said three-dimensional work surface represented by said profile information in said two-dimensional coordinate position; and
   a function of displaying said work surface represented by said profile information and said processing pattern represented by said three-dimensional space coordinate data in three dimensions on a second display means.

16. The computer-readable storage medium as defined in claim 15, further comprising a function of adjusting said processing pattern represented by said three-dimensional space coordinate data in said specified direction in which said laser beam is focused on said three-dimensional work surface.

17. The computer-readable storage medium as defined in claim 15, further comprising a function of adjusting said processing pattern represented by said three-dimensional space coordinate data.

18. The computer-readable storage medium as defined in claim 15, wherein said function of inputting pattern information is provided with a function of specifying a size in which said processing pattern represented by said pattern information is displayed on said first display means.

19. The computer-readable storage medium as defined in claim 15, wherein said plurality of predetermined different profiles of work surface include at least a circular conical profile, a cylindrical columnar profile and a spherical profile.

20. The computer-readable storage medium as defined in claim 19, wherein said function of inputting profile information is provided with a function of specifying a size of said three-dimensional profile to be selected.

21. A computer-readable storage medium in which a computer program is stored for setting three-dimensional processing data for driving a laser marking device to process a three-dimensional work surface in a specified processing pattern with a laser beam focused on the three-dimensional work surface, said computer program comprising:
a function of setting parameters of pattern information representing a processing pattern in which a three-dimensional work surface is processed and a two-dimensional position at which said processing pattern is displayed on display means so as to match with a work surface to be processed; and
a function of adjusting, as appropriate, said processing pattern in a position on a two-dimensional coordinates displayed based on said parameters on said display means.

22. A laser marking machine for processing a three-dimensional work surface with a laser beam focused in a specified direction on the three-dimensional work surface, said laser marking machine comprising:
a laser source for generating a laser beam;
a scanner for scanning a scan field with said laser beam; said scanner comprising:
a beam expander for varying a focal distance of said laser beam; and
scanning means for deflecting said laser beam emanating from said beam expander in two directions perpendicular to each other so as thereby to scan said scan field with said laser beam;
pattern information input means for inputting pattern information representing a processing pattern in which a three-dimensional work surface is processed and a two-dimensional position for display of said processing pattern;
two-dimensional display means for displaying thereon said processing pattern in two-dimensions at said two-dimensional position based on said pattern information;
position adjusting means for adjusting said processing pattern in a desired two-dimensional coordinate position on said two-dimensional display means;
profile information input means for inputting profile information representing at least a three-dimensional profile of work surface for processing said three-dimensional profile being selected from a plurality of predetermined different profiles of work surface;
coordinate data conversion means for converting coordinate data of said processing pattern from two-dimensional plane coordinate data to three-dimensional space coordinate data so as to match a processing pattern represented by said pattern information with said work surface represented by said profile information in said two-dimensional coordinate position;
three-dimensional display means for displaying thereon in three dimensions said work surface represented by said profile information and said processing pattern represented by said three-dimensional space coordinate data; and
control means for exciting said laser source and driving said scanner on the basis of said three-dimensional processing data of said processing pattern so as to thereby process said work surface in said processing pattern.

23. The laser marking machine as defined in claim 22, further comprising height adjusting means for adjusting said processing pattern represented by said three-dimensional space coordinate data in said specified direction in which said laser beam is focused on said three-dimensional work surface.

24. The laser marking machine as defined in claim 22, further comprising layout adjusting means for adjusting said processing pattern represented by said three-dimensional space coordinate data in a layout.

25. The laser marking machine as defined in claim 22, wherein said pattern information input means is provided with size specifying means for specifying a size in which said processing pattern represented by said pattern information is displayed on said two-dimensional display means.

26. The laser marking machine as defined in claim 22, wherein said plurality of predetermined different profiles of work surface include at least a circular conical profile, a cylindrical columnar profile and a spherical profile.

27. The laser marking machine as defined in claim 26, wherein said profile information input means is provided with size specifying means for specifying a size of said three-dimensional profile to be selected.

* * * * *